US011272573B2

United States Patent
Uchiyama et al.

(10) Patent No.: US 11,272,573 B2
(45) Date of Patent: Mar. 8, 2022

(54) COMMUNICATION SYSTEMS FOR ALLOCATING RESOURCES FOR FEEDBACK BETWEEN DEVICES

(71) Applicant: Sony Corporation, Tokyo (JP)

(72) Inventors: Hiromasa Uchiyama, Tokyo (JP); Kazuyuki Shimezawa, Kanagawa (JP); Naoki Kusashima, Kanagawa (JP); Hiroki Matsuda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 19 days.

(21) Appl. No.: 16/649,143

(22) PCT Filed: Aug. 16, 2018

(86) PCT No.: PCT/JP2018/030454
§ 371 (c)(1),
(2) Date: Mar. 20, 2020

(87) PCT Pub. No.: WO2019/064983
PCT Pub. Date: Apr. 4, 2019

(65) Prior Publication Data
US 2020/0296796 A1    Sep. 17, 2020

(30) Foreign Application Priority Data

Sep. 27, 2017  (JP) .............................. JP2017-186184

(51) Int. Cl.
*H04W 88/06*    (2009.01)
*H04W 4/40*    (2018.01)
(Continued)

(52) U.S. Cl.
CPC ........... *H04W 88/06* (2013.01); *H04L 5/0055* (2013.01); *H04W 4/40* (2018.02); *H04W 28/26* (2013.01);
(Continued)

(58) Field of Classification Search
CPC .............. H04W 12/069; H04W 28/26; H04W 74/0816; H04W 28/16; H04W 56/002;
(Continued)

(56) References Cited

U.S. PATENT DOCUMENTS 8,804,689 B2 *  8/2014  Madan ................. H04W 28/26
                                                    370/345
9,042,343 B2 *  5/2015  Lappetelainen .... H04W 12/069
                                                    370/331
(Continued)

FOREIGN PATENT DOCUMENTS

JP    2017-139659 A    8/2017
JP    2017-139661 A    8/2017
(Continued)

OTHER PUBLICATIONS

F. Jameel, Z. Hamid, F. Jabeen, S. Zeadally and M. A. Javed, "A Survey of Device-to-Device Communications: Research Issues and Challenges," in IEEE Communications Surveys & Tutorials, vol. 20, No. 3, pp. 2133-2168, thirdquarter 2018, doi: 10.1109/COMST. 2018.2828120. Nov. 2018 (Year: 2018).*
(Continued)

Primary Examiner — William D Cumming
(74) Attorney, Agent, or Firm — Xsensus LLP

(57) ABSTRACT

A communication device performs direct communication between terminals. The system transmits and receives wireless signals and controls transmission of data using a predetermined resource pool and reception of feedback from a transmission destination terminal of the data. The system performs control to secure a resource for transmission of the data and a resource for the feedback for the transmission destination terminal of the data within the predetermined
(Continued)

resource pool, and notifies the transmission destination terminal of information regarding the resource for the feedback by using SCI.

17 Claims, 19 Drawing Sheets

(51) Int. Cl.
| | |
|---|---|
| *H04W 76/27* | (2018.01) |
| *H04L 5/00* | (2006.01) |
| *H04W 28/26* | (2009.01) |
| *H04W 72/02* | (2009.01) |
| *H04W 72/04* | (2009.01) |
| *H04W 72/10* | (2009.01) |
| *H04W 92/18* | (2009.01) |

(52) U.S. Cl.
CPC ....... *H04W 72/02* (2013.01); *H04W 72/0406* (2013.01); *H04W 72/10* (2013.01); *H04W 76/27* (2018.02); *H04W 92/18* (2013.01)

(58) Field of Classification Search
CPC ........... H04W 56/0015; H04W 74/085; H04W 72/04
USPC ................................ 370/331, 329, 345, 336
See application file for complete search history.

(56) References Cited

U.S. PATENT DOCUMENTS

| | | | | |
|---|---|---|---|---|
| 9,473,988 | B2* | 10/2016 | Kim | H04W 28/26 |
| 9,723,630 | B2* | 8/2017 | Xue | H04W 74/0816 |
| 9,974,066 | B2* | 5/2018 | Novlan | H04W 56/0015 |
| 10,440,755 | B2* | 10/2019 | Li | H04W 74/002 |
| 10,764,865 | B2* | 9/2020 | Yasukawa | H04L 5/0044 |
| 2013/0039340 | A1* | 2/2013 | Lappetelainen | H04W 12/069 |
| | | | | 370/331 |
| 2013/0308549 | A1* | 11/2013 | Madan | H04W 28/26 |
| | | | | 370/329 |
| 2014/0079015 | A1* | 3/2014 | Kim | H04L 27/0006 |
| | | | | 370/329 |
| 2014/0328329 | A1* | 11/2014 | Novlan | H04W 56/002 |
| | | | | 370/336 |
| 2015/0271786 | A1* | 9/2015 | Xue | H04W 74/0816 |
| | | | | 370/329 |
| 2017/0347394 | A1* | 11/2017 | Yasukawa | H04L 1/1896 |
| 2018/0103490 | A1* | 4/2018 | Li | H04W 74/085 |
| 2018/0270801 | A1* | 9/2018 | Novlan | H04W 56/0015 |
| 2018/0279258 | A1* | 9/2018 | Yasukawa | H04L 5/0053 |
| 2020/0296796 | A1* | 9/2020 | Uchiyama | H04W 28/26 |
| 2020/0351831 | A1* | 11/2020 | Yasukawa | H04L 5/0044 |

FOREIGN PATENT DOCUMENTS

| | | | | |
|---|---|---|---|---|
| KR | 20100091130 A | * | 8/2010 | ........... H04B 7/2606 |
| WO | 2014/167883 A1 | | 10/2014 | |
| WO | 2016/076301 A1 | | 5/2016 | |
| WO | WO-2020218902 A1 | * | 10/2020 | ............ H04W 76/36 |
| WO | WO-2021022551 A1 | * | 2/2021 | ............ H04W 72/04 |

OTHER PUBLICATIONS

F. Jameel, Z. Hamid, F. Jabeen, S. Zeadally and M. A. Javed, "A Survey of Device-to-Device Communications: Research Issues and Challenges," in IEEE Communications Surveys & Tutorials, vol. 20, No. 3, pp. 2133-2168, thirdquarter 2018, doi: 10.1109/COMST. 2018.2828120. Apr. 2018 (Year: 2018).*

International Search Report and Written Opinion dated Nov. 6, 2018 for PCT/JP2018/030454 filed on Aug. 16, 2018, 7 pages including English Translation of the International Search Report.

Huawei et al.: "Feedback information for sidelink link adaptation", 3GPP Draft; RI-1712136, 3rd Generation Partnership Project (3GPP), vol. RAN WG1, No. Prague, Czech Republic; Aug. 21, 2017-Aug. 25, 2017Aug. 20, 2017 (Aug. 20, 2017), XP051314956.

Panasonic: "Discussion on sidel ink feedback in FeD2D", 3GPP Draft; RI-1713856, 3rd Generation Partnership Project (3GPP), vol. RAN WG1, No. Prague, Czechia; Aug. 21, 2017-Aug. 25, 2017Aug. 20, 2017 (Aug. 20, 2017), XP051316650.

* cited by examiner

FIG. 1
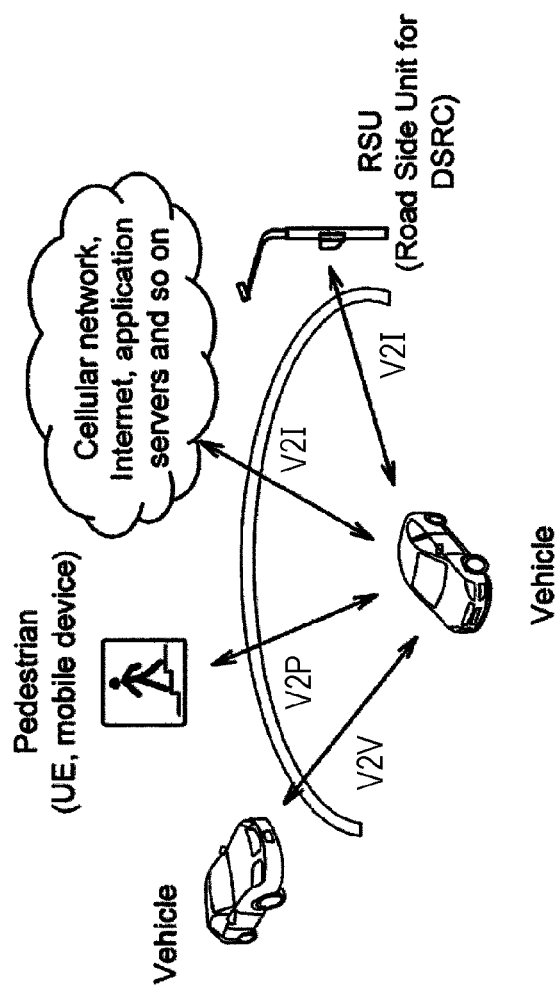
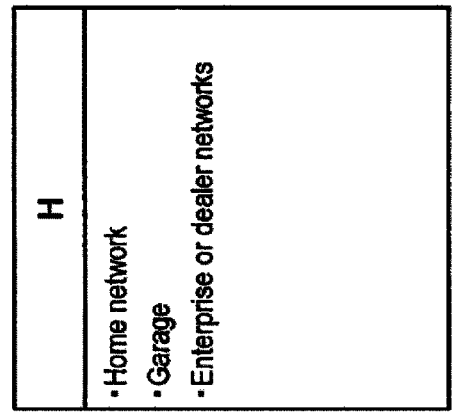
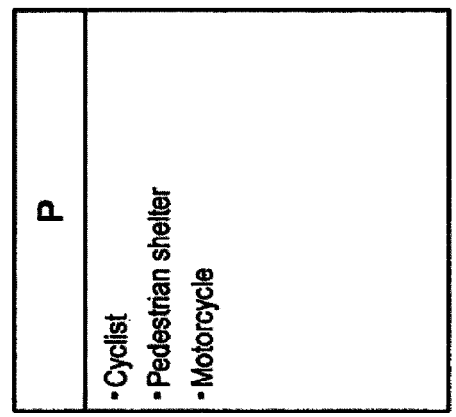
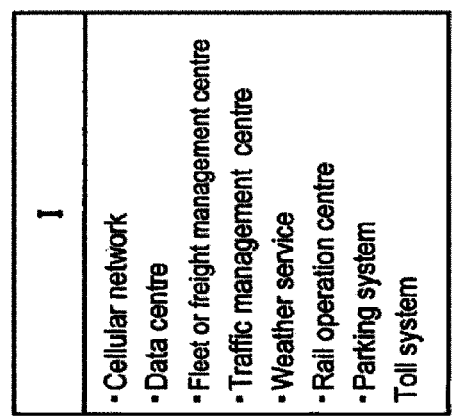
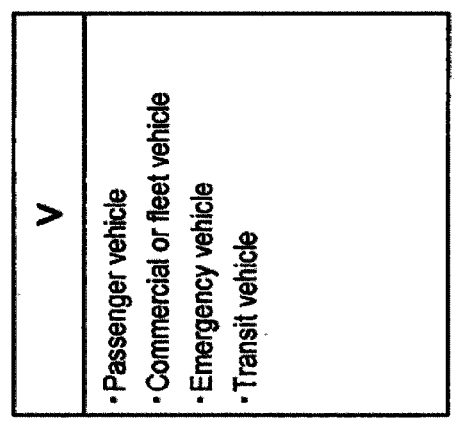

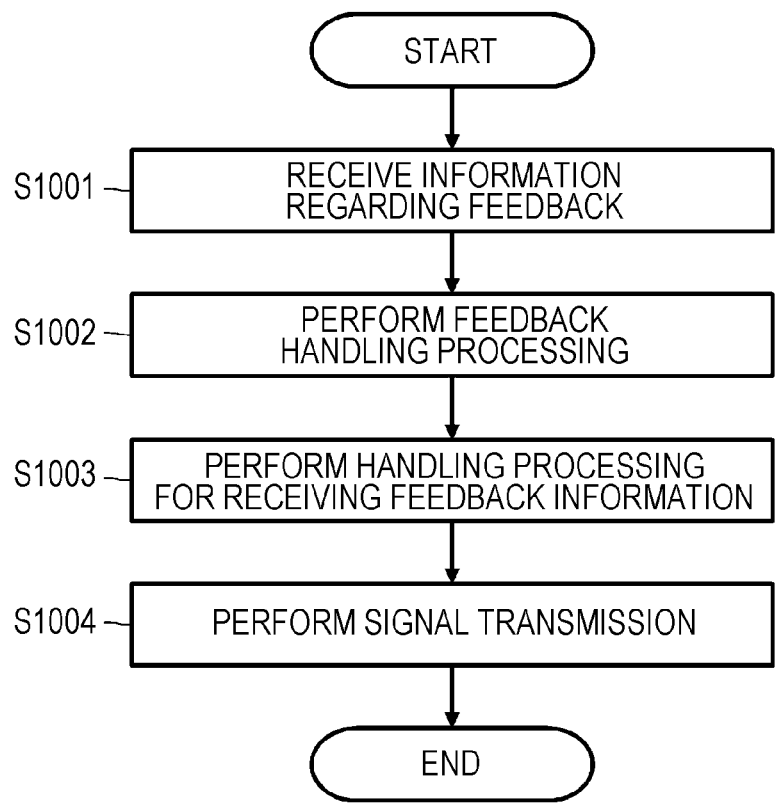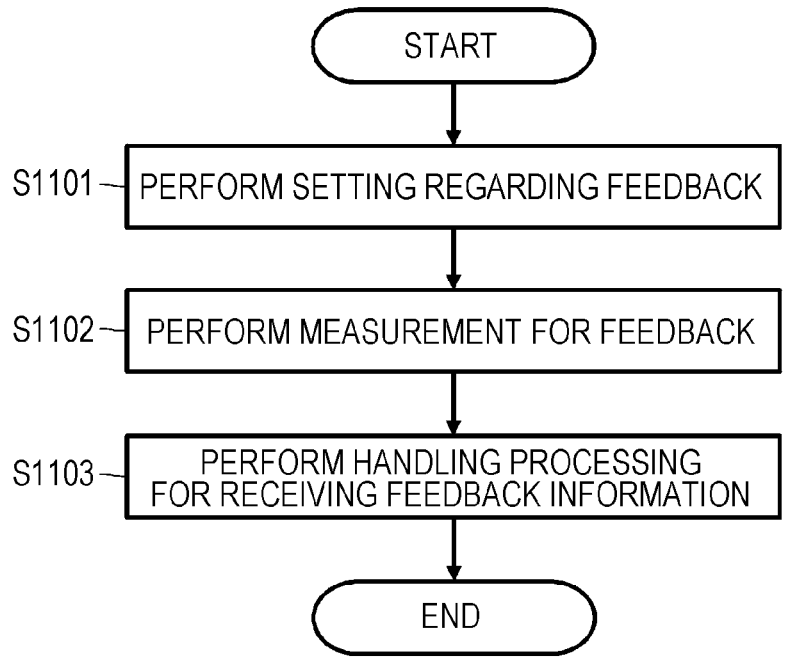

# COMMUNICATION SYSTEMS FOR ALLOCATING RESOURCES FOR FEEDBACK BETWEEN DEVICES

CROSS-REFERENCE TO RELATED APPLICATIONS

The present application is based on PCT filing PCT/JP2018/030454, filed Aug. 16, 2018, which claims priority to JP 2017-186184, filed Sep. 27, 2017, the entire contents of each are incorporated herein by reference.

TECHNICAL FIELD

The technology disclosed in this specification relates to a communication device that performs direct communication between terminals.

BACKGROUND ART

In recent years, expectations for in-vehicle communication (V2X communication) have increased to realize future automatic driving. V2X communication is an abbreviation for Vehicle to X communication, and is a system in which a vehicle communicates with "something". Examples of "something" here include a vehicle, an infrastructure, a pedestrian, and the like (V2V, V2I/N, V2P).

As for wireless communication for automobiles, the development of IEEE 802.11p-based Dedicated Short Range Communication (DSRC) has been mainly progressed so far. In recent years, in Third Generation Partnership Project (3GPP), standardization has been carried out of "LTE-based V2X" that is Long Term Evolution (LTE) based in-vehicle communication. In 3GPP, V2X standardization activities continue further in 5G (New Radio (NR)).

CITATION LIST

Patent Document

Patent Document 1: Japanese Patent Application Laid-Open No. 2017-139659
Patent Document 2: Japanese Patent Application Laid-Open No. 2017-139661

SUMMARY OF THE INVENTION

Problems to be Solved by the Invention

An object of the technology disclosed in this specification is to provide a communication device that performs direct communication between terminals.

Solutions to Problems

A first aspect of the technology disclosed in this specification is a communication device including:
 a communication unit that transmits and receives wireless signals; and
 a control unit that controls transmission of data using a predetermined resource pool and reception of feedback from a transmission destination terminal of the data by the communication unit. The communication device according to the first aspect can suitably operate as a transmission terminal for a sidelink in V2X communication, for example.

The control unit further performs control to secure a resource for transmission of the data and a resource for the feedback for the transmission destination terminal of the data within the predetermined resource pool, and to notify the transmission destination terminal of the resource for the feedback secured.

Furthermore, the control unit further controls retransmission of the data in response to receiving the feedback. For example, the control unit determines whether or not to perform data retransmission on the basis of a condition including at least one of a retransmission upper limit number, the number of received NACKs, a priority of the data transmitted, a channel status of a link for transmission and reception of the data and the feedback, or a process status regarding data retransmission in the transmission destination terminal.

Furthermore, a second aspect of the technology disclosed in this specification is a communication device including:
 a communication unit that receives an uplink wireless signal from a terminal and transmits a downlink wireless signal to a terminal; and
 a control unit that controls allocation of a resource for a sidelink for communication between the terminals, in which
 the control unit allocates a resource for feedback within a resource pool allocated for the sidelink. The communication device according to the second aspect can operate as a base station in V2X communication, for example.

The control unit further performs control to periodically allocate the resource for the feedback in the predetermined resource pool, and to perform notification to the terminal. Furthermore, the control unit causes an identical resource to be multiplexed into the resource for the feedback for a plurality of terminals by using coded multiplex or preamble transmission.

Furthermore, a third aspect of the technology disclosed in this specification is a communication device including:
 a communication unit that transmits and receives wireless signals; and
 a control unit that controls reception of data transmitted by using a predetermined resource pool and transmission of feedback to a transmission source terminal of the data, by the communication unit. The communication device according to the third aspect can suitably operate as a reception terminal for a sidelink in V2X communication, for example.

The control unit performs control to transmit feedback by using a resource for feedback secured by the transmission source terminal.

Alternatively, the control unit performs control to transmit feedback by using a resource for feedback periodically allocated in the predetermined resource pool by a base station.

Effects of the Invention

According to the technology disclosed in this specification, it is possible to provide a communication device that performs direct communication between terminals.

Note that, the effects described in this specification are merely examples, and the effects of the present invention are not limited to them. Furthermore, the present invention may have additional effects other than the effects described above.

Still other objects, features, and advantages of the technology disclosed in this specification will become apparent from the detailed description based on embodiments and attached drawings to be described later.

BRIEF DESCRIPTION OF DRAWINGS

FIG. 1 is a diagram illustrating an outline of V2X communication.

FIG. 10 is a flowchart illustrating a processing procedure for a transmission terminal to handle feedback from a reception terminal during sidelink communication.

FIG. 11 is a flowchart illustrating a processing procedure for a reception terminal to feed back information to a transmission terminal during sidelink communication.

MODE FOR CARRYING OUT THE INVENTION

Figure 2:
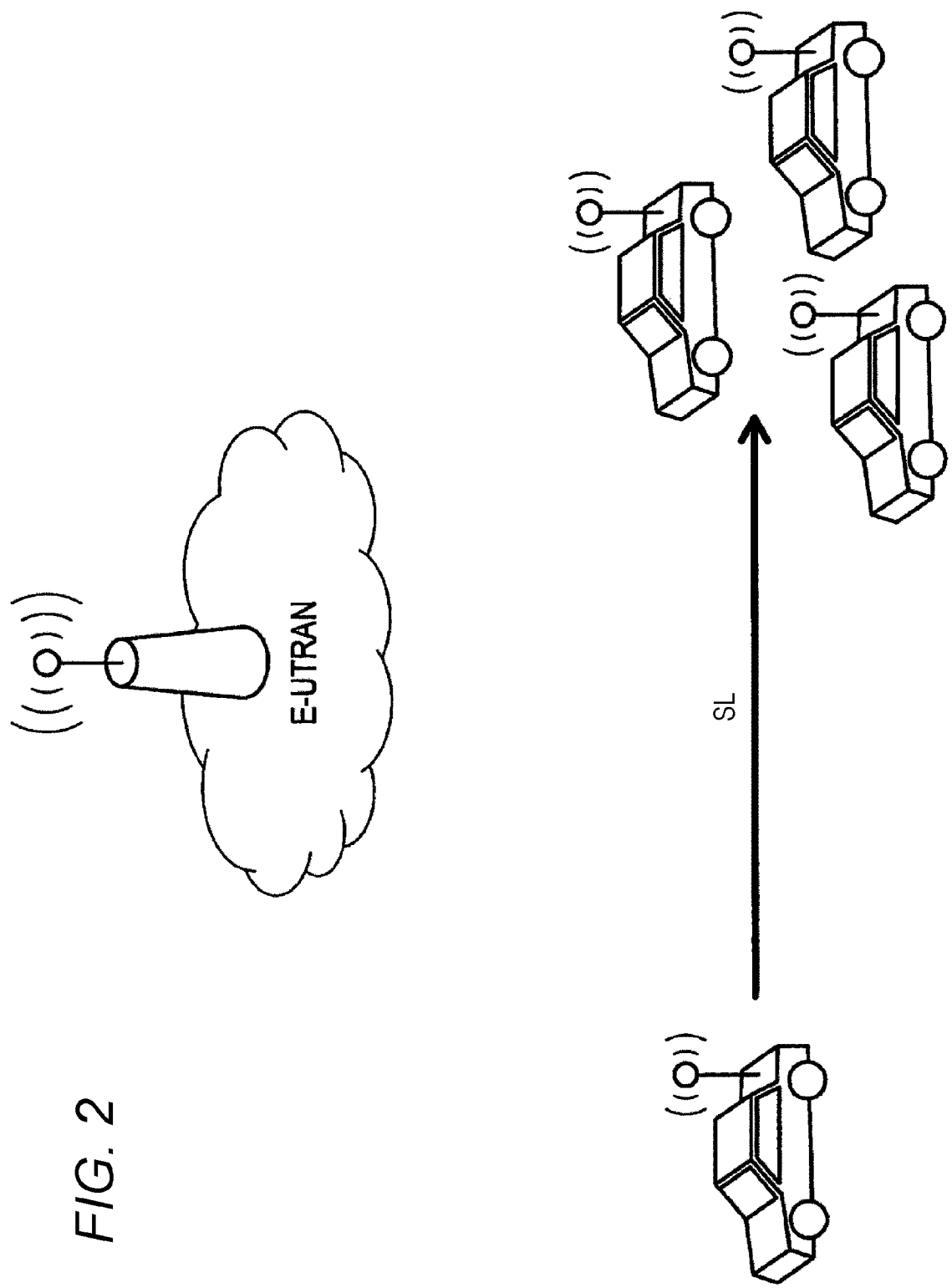
FIG. 2 is a diagram illustrating a first scenario of V2V communication.

Hereinafter, embodiments of the technology disclosed in this specification will be described in detail with reference to the drawings.

A. System Configuration

By mounting a communication device on a mobile body such as a vehicle, direct communication is realized between the mobile body and various objects. In particular, communication between the vehicle and various objects is called V2X communication. FIG. 1 illustrates an outline of V2X communication. As illustrated, examples of V2X communication include Vehicle to Vehicle (V2V) communication, Vehicle to Infrastructure (V2I) communication, Vehicle to Pedestrian (V2P) communication, Vehicle to Home (V2H) communication, and the like. Furthermore, although not illustrated, Vehicle to Network (V2N) communication is also included in V2X communication. Note that, the first and third characters of V2X communication mean the start point and end point of communication, respectively, and do not limit the communication path. For example, V2V communication is a concept that includes both communication between vehicles directly and communication between vehicles indirectly via a base station or the like.

Examples of a communication target of the vehicle in V2V communication include a passenger vehicle, a commercial or fleet vehicle, an emergency vehicle, and a transit vehicle. Furthermore, examples of a communication target of the vehicle in V2I communication include a cellular network, a data centre, a fleet or freight management centre, a traffic management centre, a weather service, a rail operation centre, a parking system, a toll system, and the like. Furthermore, examples of a communication target of the vehicle in V2P communication include a cyclist, a pedestrian shelter, a motorcycle, and the like. Furthermore, examples of a communication target of the vehicle in V2H communication include a home network, a garage, an enterprise or dealer network, and the like.

As for wireless communication for automobiles, the development of IEEE 802.11p-based DSRC has been mainly progressed so far, but in recent years, in 3GPP, standardization has been carried out of LTE-based V2X (described above). In LTE-based V2X communication, exchange of basic safety message and the like is supported, for example.

On the other hand, with the aim of further improving V2X communication, enhanced V2X (eV2X) communication using 5G technology is being examined in 3GPP. In eV2X communication, new use cases are supported that require high reliability, low latency, high-speed communication, and high capacity, which have not been supported by LTE-based V2X before. Use cases and requirements for eV2X are described in 3GPP TR22.886. Examples of the main use cases supported by eV2X include the following (1) to (4).

(1) Vehicle Platooning

This is a use case of platooning, in which a plurality of vehicles forms a platoon and travels in the same direction, and information is exchanged for controlling platooning from a vehicle that leads the platooning. By exchanging such information, an inter-vehicle distance can be reduced in the platooning.

(2) Extended Sensors

Exchange of sensor-related information (raw data before data processing and processed data) is enabled between vehicles, and the like. Sensor information is collected through a local sensor, a surrounding vehicle, a road side unit (RSU), a live video image between pedestrians, a V2X application server, and the like. By exchanging such information, the vehicle can acquire information that cannot be obtained by its own sensor information, and can acknowledge or recognize a wider range of environments. Since a lot of information needs to be exchanged, a high data rate is required for communication.

(3) Advanced Driving

Semi-automatic driving and fully automatic driving are enabled. Each vehicle allows the RSU to share acknowledgment/recognition information obtained from each vehicle's own sensor and the like with surrounding vehicles, so that each vehicle's track and operation can be adjusted in synchronization and coordination with the surrounding vehicles. Each vehicle can also share an aim or intention of driving with the surrounding vehicles.

(4) Remote Driving

A remote operator or V2X application is allowed to perform remote operation. Remote operation is used for a person who cannot drive or for a hazardous area. For public transportation for which the route and the road for traveling are determined to some extent, it is also possible to use operation based on cloud computing. High reliability and low transmission delay are required for communication.

To realize the use cases (1) to (4) as described above, enhancement is required of the physical layer of eV2X communication. Examples of a main enhancement include improvement of communication between an infrastructure and a terminal, and improvement of communication between terminals. As the communication between an infrastructure and a terminal, V2N communication and V2I communication (evolved Node B (eNB) type RSU (base station type RSU) communication) are targeted for improvement. Furthermore, as the communication between terminals, V2V communication and V2P communication are targeted for improvement. Points are described below of the main enhancement considered to be necessary in the physical layer of these V2X communications.

Channel format
Flexible numerology
short Transmission Time Interval (TTI)
Multi antenna support
Waveform enhancement
Sidelink feedback communication
Hybrid Automatic Repeat Request (HARQ)
Channel Status Information (CSI)
Resource allocation method in sidelink communication
Vehicle position information estimation technology
Relay communication between terminals
Support for unicast communication and multicast communication
Multi-carrier communication and carrier aggregation
High frequency (millimeter wave) support (example: higher than or equal to 6 GHz)

There are various operation scenarios of V2X communication. The operation scenario of V2X communication is configured on the basis of V2V communication, and when one automobile is replaced with Pedestrian, the communication becomes V2P communication, and when the end point is an infrastructure or a network, the communication becomes V2I communication or V2N communication. FIGS. 2 to 6 exemplify scenarios of V2V communication that are the basis of V2X communication.

FIG. 2 illustrates a first scenario of V2V communication. In the first scenario, mobile bodies such as vehicles perform V2V communication directly. The communication link in which the vehicles directly communicate with each other in this case is a sidelink (SL).

Figure 3:
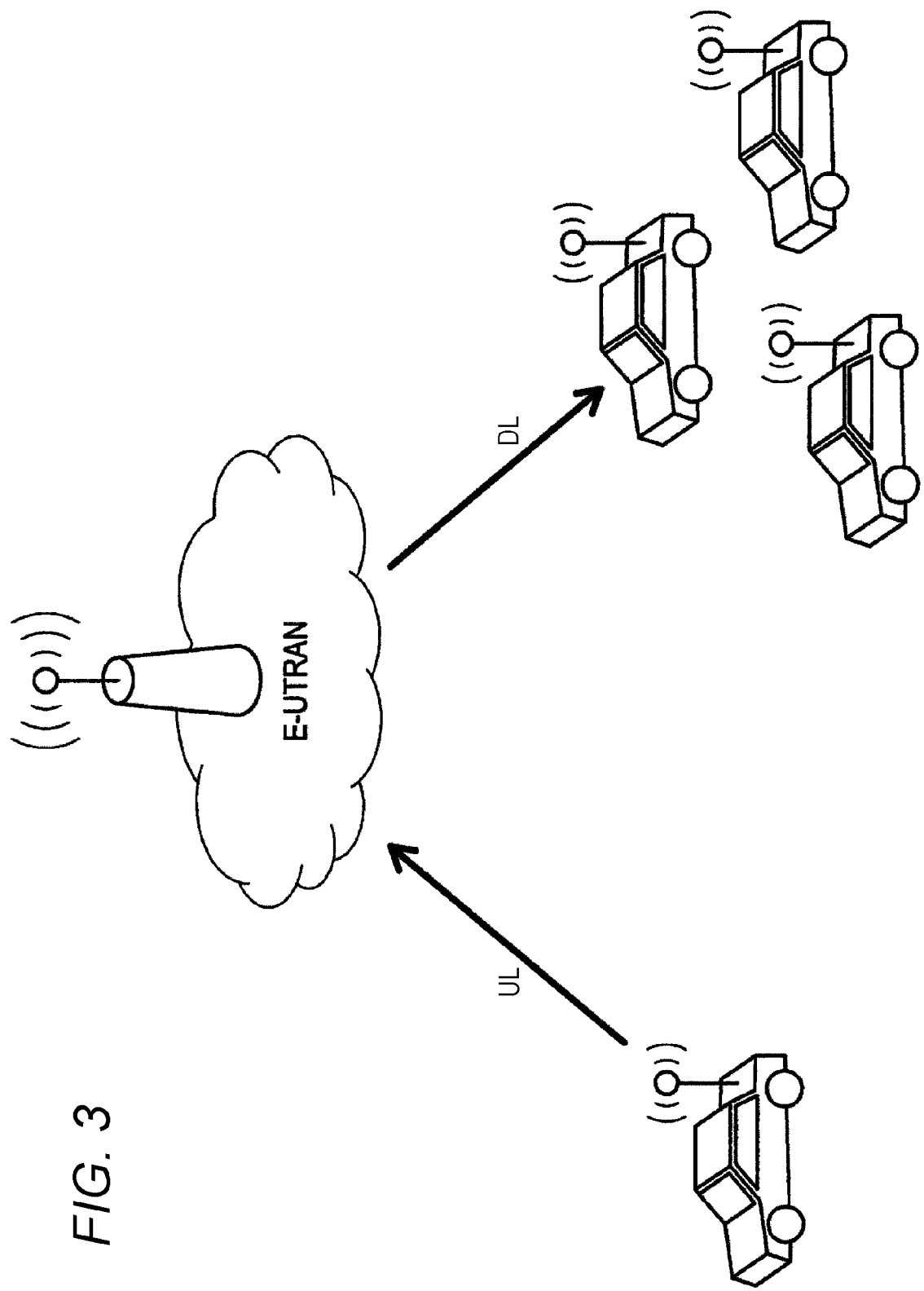
FIG. 3 is a diagram illustrating a second scenario of V2V communication.

FIG. 3 illustrates a second scenario of V2V communication. In the second scenario, mobile bodies such as vehicles perform V2V communication indirectly via an Evolved Universal Terrestrial Radio Access (E-UTRAN), that is, via a base station. The communication link from the transmission side to the base station is an uplink (UL), and the communication link from the base station to the reception side is a downlink (DL).

Figure 4:
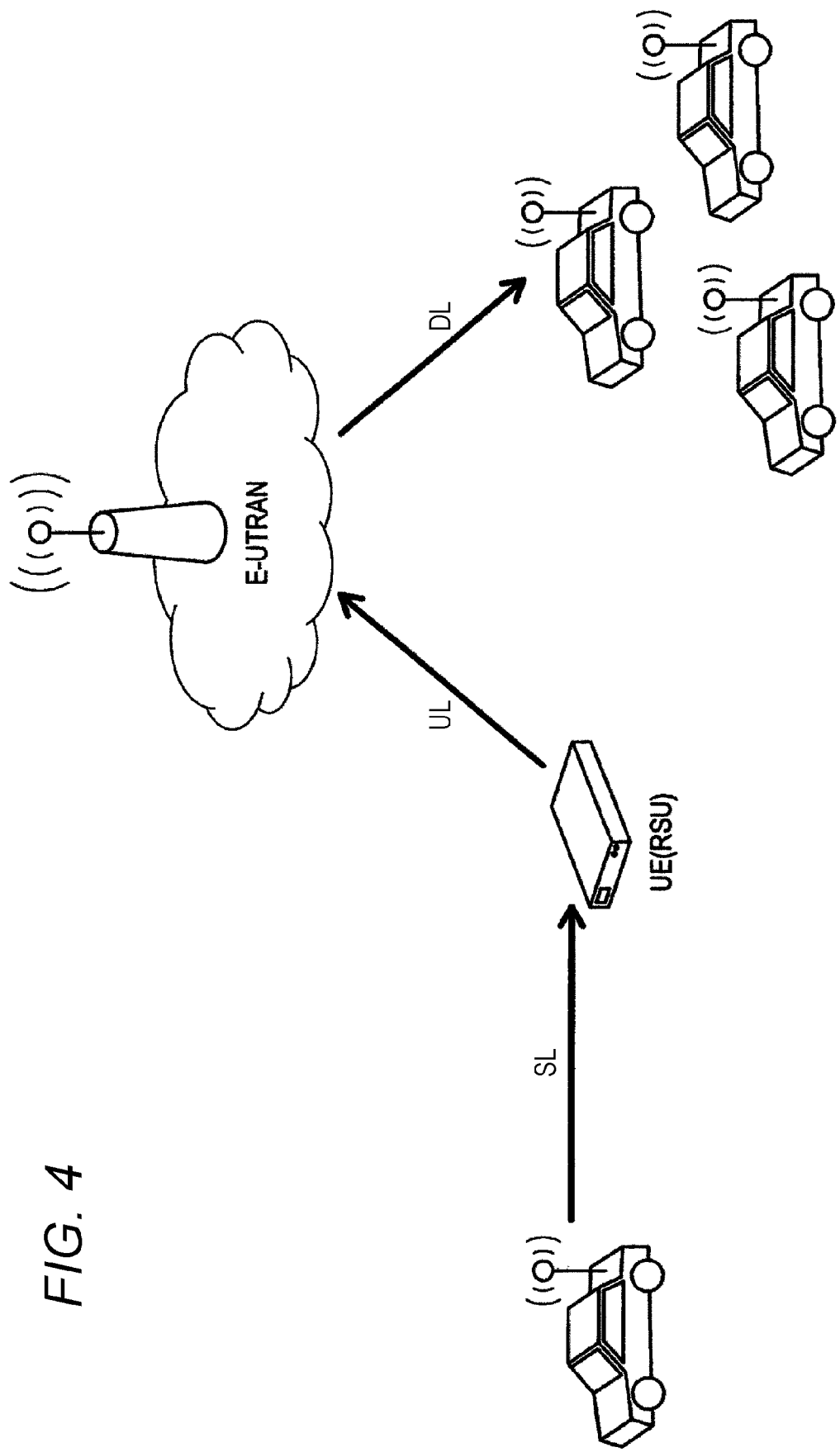
FIG. 4 is a diagram illustrating a third scenario of V2V communication.

FIG. 4 illustrates a third scenario of V2V communication. In the third scenario, a mobile body such as a vehicle transmits a signal to other mobile bodies via an RSU or RSU type user terminal (User Equipment (UE)) and an E-UTRAN in order. Communication links between the devices are an SL, UL, and DL in order.

Figure 5:
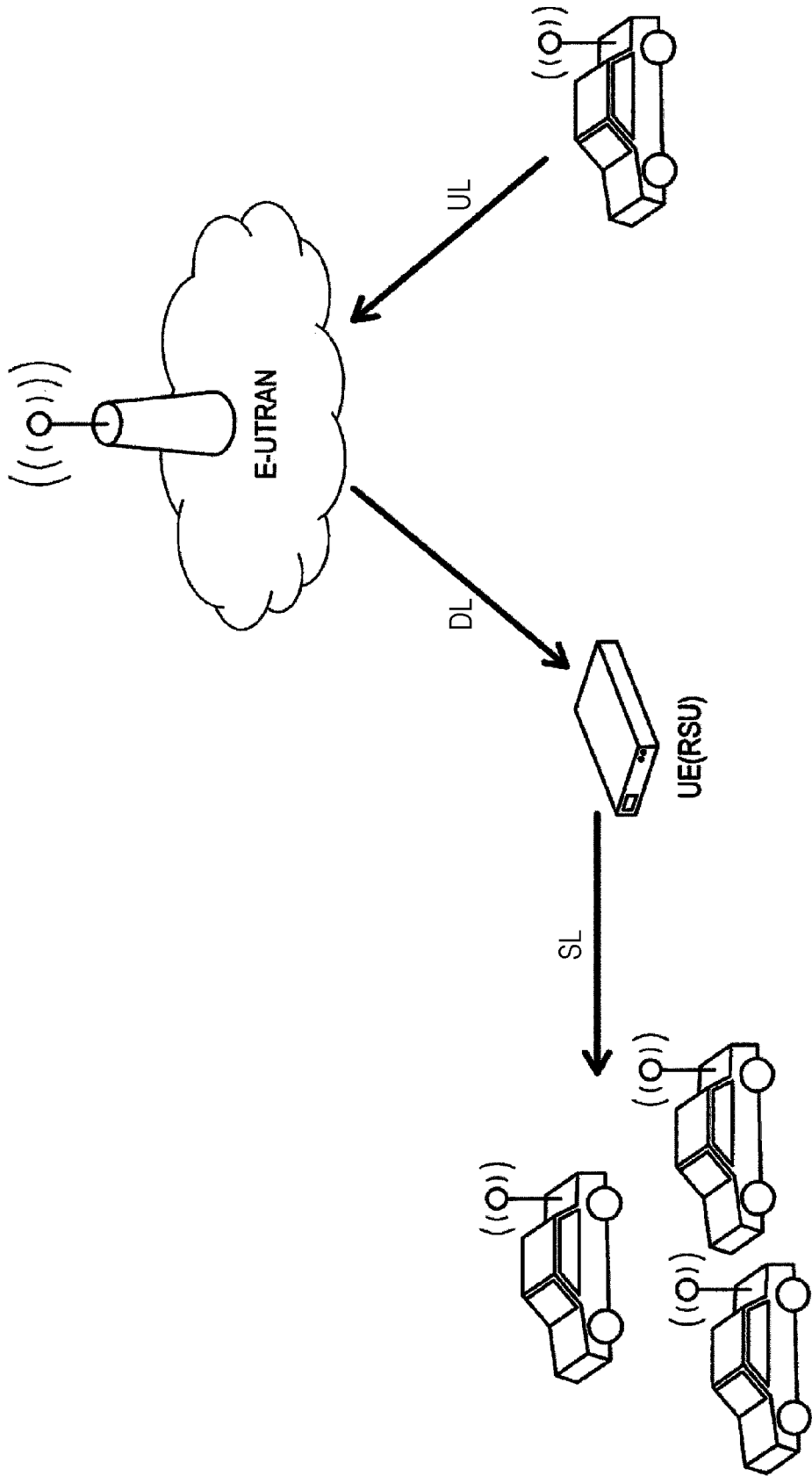
FIG. 5 is a diagram illustrating a fourth scenario of V2V communication.

FIG. 5 illustrates a fourth scenario of V2V communication. In the fourth scenario, a mobile body such as a vehicle transmits a signal to other mobile bodies via an E-UTRAN and RSU or RSU type UE in order. Communication links between the devices are an UL, DL, and SL in order.

Figure 6:
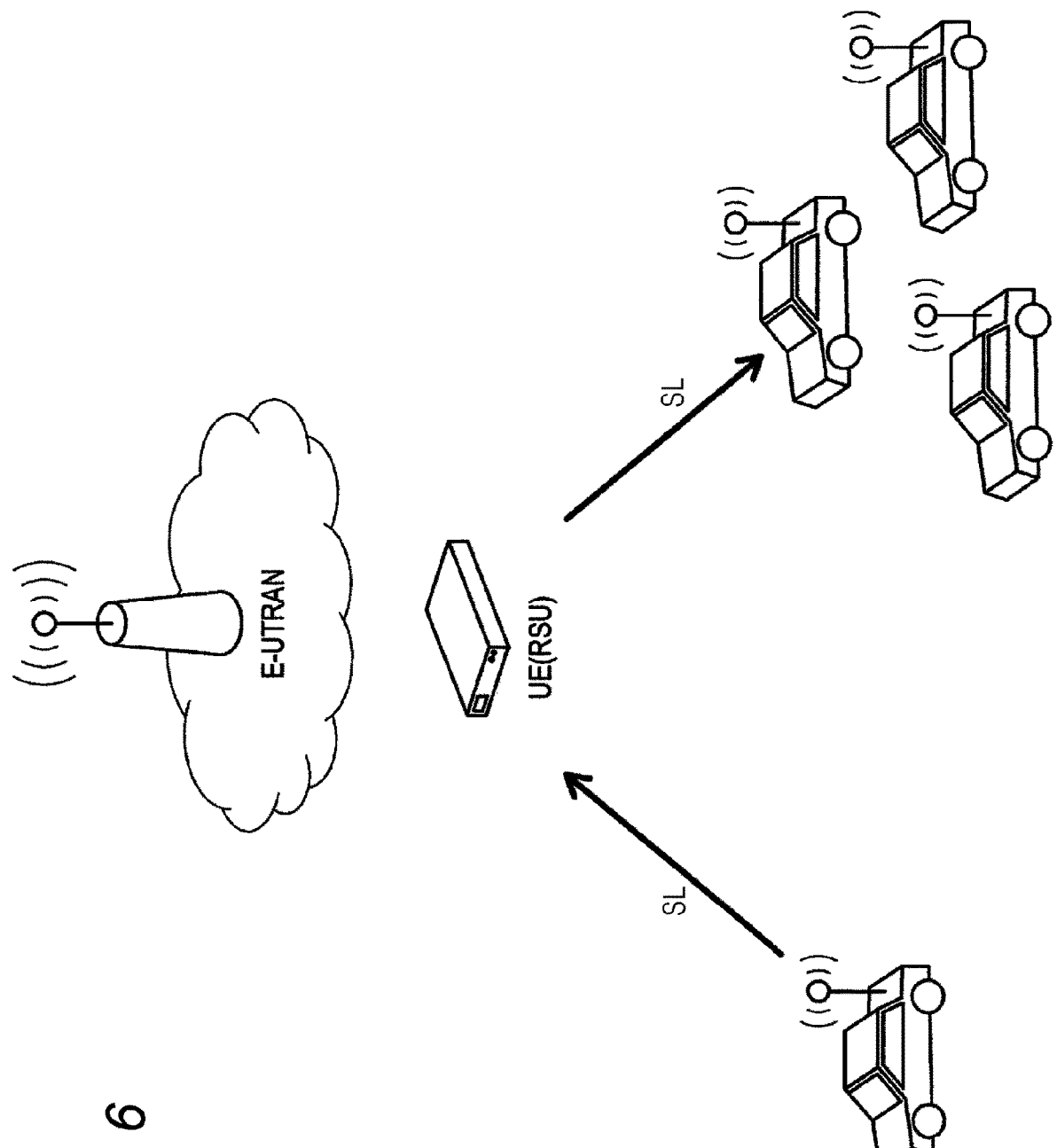
FIG. 6 is a diagram illustrating a fifth scenario of V2V communication.

FIG. 6 illustrates a fifth scenario of V2V communication. In the fifth scenario, mobile bodies such as vehicles perform V2V communication indirectly via an RSU or RSU type UE. The communication link between the mobile body and the RSU or RSU type UE is an SL.

Each scenario illustrated in FIGS. 2 to 6 becomes a scenario of V2P communication when one of the mobile bodies is changed to a pedestrian. Similarly, each scenario becomes a scenario of V2I communication or V2N communication when one of the mobile bodies is changed to an infrastructure or a network.

In this specification, attention is paid in particular to sidelink feedback communication among the enhancements (described above) of the physical layer of eV2X communication.

In conventional V2X communication, broadcast communication has been adopted for the sidelink (see, for example, Patent Document 1). Since a transmission terminal cannot obtain feedback from a reception terminal, the reliability is improved by repeatedly performing transmission a plurality of times from the beginning. In other words, in conventional sidelink communication, a broadcast signal is transmitted a plurality of times at the physical layer level, and the reception side receives all signals for the time being, and determines whether or not the received signal is addressed to itself in the upper layer. Thus, there is no concept of retransmission in the first place. However, in such communication that repeatedly performs transmission, it is difficult to ensure reliability since there is no retransmission mechanism. Furthermore, extra frequency resources are consumed by repeated transmission, which is not desirable from the viewpoint of frequency utilization efficiency.

Thus, in this specification, feedback type sidelink communication is proposed that performs communication on the basis of feedback such as HARQ and channel information from the reception side. The reception side transmits a feedback signal (for example, ACK/NACK, propagation environment information, or the like), whereby the reliability is improved. Furthermore, frequency utilization efficiency is improved as compared with a case where a broadcast signal is transmitted a plurality of times at the physical layer level. However, details will be described later of the feedback type sidelink communication.

Figure 7:
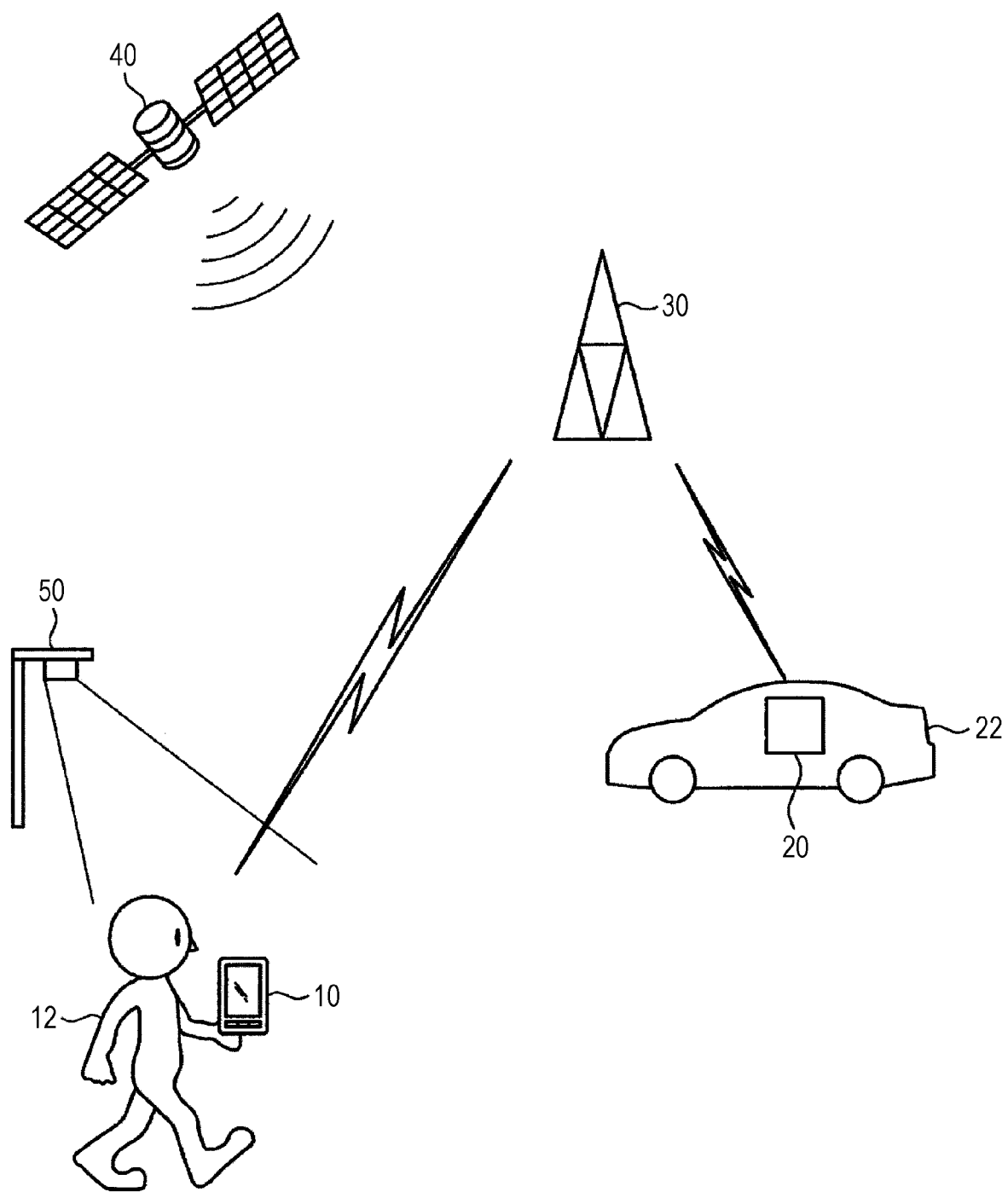
FIG. 7 is a diagram schematically illustrating a configuration example of a wireless communication system in which V2X communication is performed.

FIG. 7 schematically illustrates a configuration example of a wireless communication system in which V2X communication is performed. The illustrated wireless communication system includes a UE 10, a UE 20, a vehicle 22, an eNB (base station) 30, a Global Navigation Satellite System (GNSS) satellite 40, and an RSU 50.

The eNB 30 is a cellular base station that provides a cellular communication service to the UE 20 positioned in a cell. For example, the eNB 30 schedules a resource for the UE 10 and the UE 20 to communicate with each other, and notifies the UE 10 and the UE 20 of the scheduled resource. Then, the eNB 30 performs uplink communication or downlink communication between the UE 10 and the UE 20 with the resource.

The GNSS satellite 40 is an artificial satellite (communication device) that orbits the earth along a predetermined orbit. The GNSS satellite 40 transmits a GNSS signal including a navigation message. The navigation message includes various types of information for position measurement, such as orbit information and time information of the GNSS satellite 40.

The RSU 50 is a communication device installed at the roadside. The RSU 50 can perform bidirectional communication with the vehicle 22 or the UE 20 mounted on the vehicle 22, or the UE 10 carried by a user 12. Note that, the RSU 50 can perform DSRC communication with the vehicle 22 or the UE 20 mounted on the vehicle 22, or the UE 10 carried by the user 12. Furthermore, in the present embodiment, it is also assumed that the RSU 50 communicates with the vehicle 22 or the UE 20 mounted on the vehicle 22, or the UE 10 carried by the user 12 in accordance with a cellular communication system.

The UE 20 is a communication device that is mounted on the vehicle 22 and moves as the vehicle 22 travels. The UE 20 has a function of communicating with the eNB 30 in accordance with control by the eNB 30. Furthermore, the UE 20 has a function of receiving the GNSS signal transmitted from the GNSS satellite 40 and measuring position information of the UE 20 from the navigation message included in the GNSS signal. Furthermore, the UE 20 has a function of communicating with the RSU 50. Moreover, the UE 20 according to the present embodiment can also directly communicate with the UE 10 carried by the user 12 or the UE 20 mounted on another vehicle 22, in other words, perform D2D communication such as the sidelink. In the following, in a case where it is not necessary to distinguish the UE 20 and the mobile body 22 in particular, they are collectively referred to as the UE 20.

The UE 10 is a communication device that is carried by the user 12 and moves as the user 12 walks and runs, or as a vehicle (a bus, a motorcycle, a vehicle, or the like) moves that the user 12 rides. The UE 10 has a function of communicating with the eNB 30 in accordance with control by the eNB 30. Furthermore, the UE 10 has a function of receiving the GNSS signal transmitted from the GNSS satellite 40 and measuring position information of the UE 10 from the navigation message included in the GNSS signal. Furthermore, the UE 10 has a function of communicating with the RSU 50. Moreover, in the present embodiment, the UE 10 can also directly communicate with another UE 10 or the UE 20, in other words, perform D2D communication such as the sidelink. Communication between the UE 10 and the UE 20 is also V2P communication.

Note that, in FIG. 7, the vehicle 22 is illustrated as an example of the mobile body, but the mobile body is not limited to the vehicle 22. For example, the mobile body may be a ship, an aircraft, a bicycle, or the like. Furthermore, in the above description, it has been described that the UE 20 has a function of receiving the GNSS signal; however, the vehicle 22 may have a function of receiving the GNSS signal, and the vehicle 22 may output a reception result of the GNSS signal to the UE 20.

Figure 8:
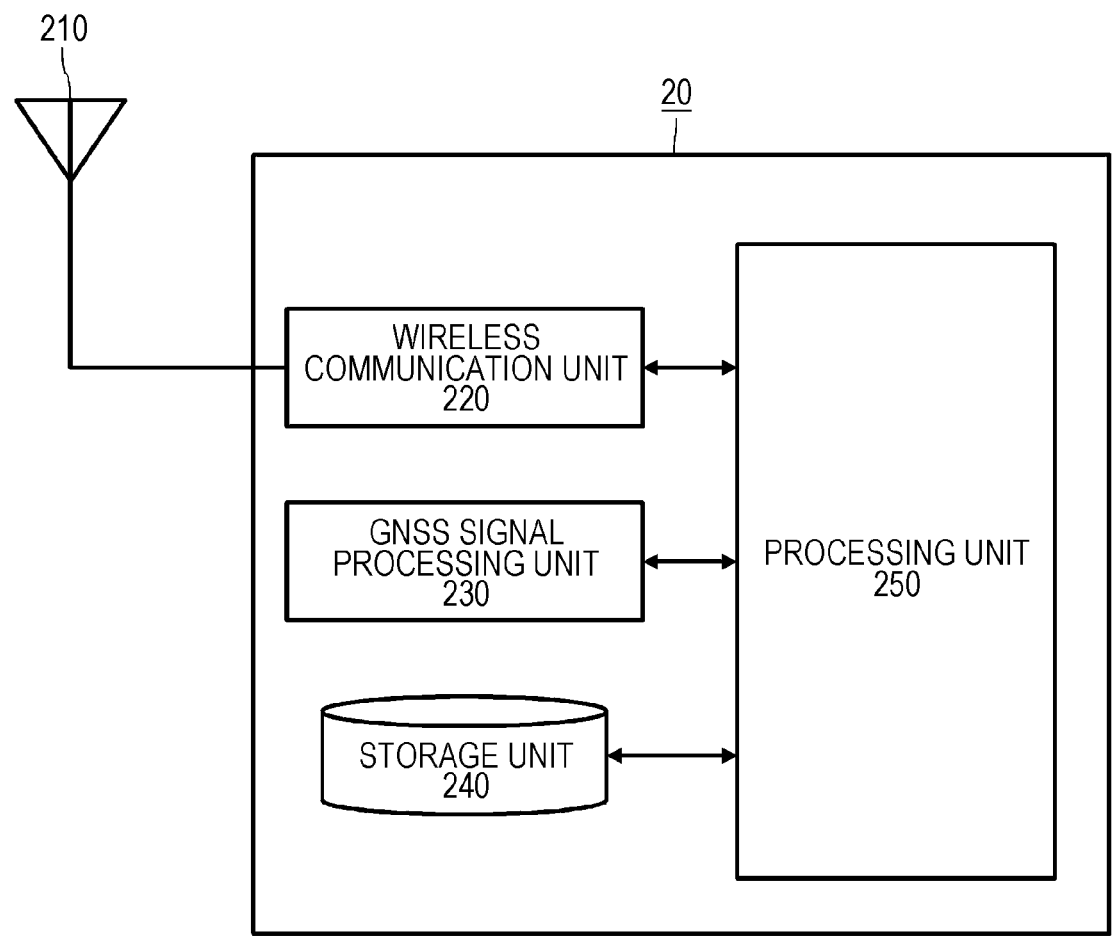
FIG. 8 is a diagram schematically illustrating a functional configuration example of a communication device (UE) used by being mounted on a mobile body such as a vehicle.

FIG. 8 schematically illustrates a functional configuration example of the communication device used by being mounted on a mobile body such as a vehicle. The communication device illustrated in FIG. 8 corresponds to, for example, the UE 20 mounted on the vehicle 22 in the wireless communication system illustrated in FIG. 7, but also the UE 10 carried by the user 12 should be understood to have a similar configuration. Furthermore, the communication device illustrated in FIG. 8 is assumed to operate as both a transmission terminal and a reception terminal in feedback type sidelink communication.

As illustrated in FIG. 8, the UE 20 includes an antenna unit 210, a wireless communication unit 220, a GNSS signal processing unit 230, a storage unit 240, and a processing unit 250.

The antenna unit 210 radiates a signal output from the wireless communication unit 220 into space as a radio wave. Furthermore, the antenna unit 210 converts a radio wave in the space into a signal and outputs the signal to the wireless communication unit 220.

The wireless communication unit 220 transmits and receives signals. For example, the wireless communication unit 220 receives a downlink signal from the eNB 30 and transmits an uplink signal to the eNB 30. Furthermore, the wireless communication unit 220 transmits and receives sidelink signals to and from the UE 10, another UE 20, or the RSU 50.

The GNSS signal processing unit 230 is configured to perform processing on the GNSS signal transmitted from the GNSS satellite 40. For example, the GNSS signal processing unit 230 measures the position information and time information of the UE 20 by processing the GNSS signal.

The storage unit 240 temporarily or non-volatilely stores a program and various data for operation of the UE 20.

The processing unit 250 provides various functions of the UE 20. For example, the processing unit 250 controls communication performed by the wireless communication unit 220. It is assumed that the communication operation of the UE 20 as a transmission terminal or reception terminal in feedback type sidelink communication described later is basically realized by the control of the processing unit 250.

Figure 20:
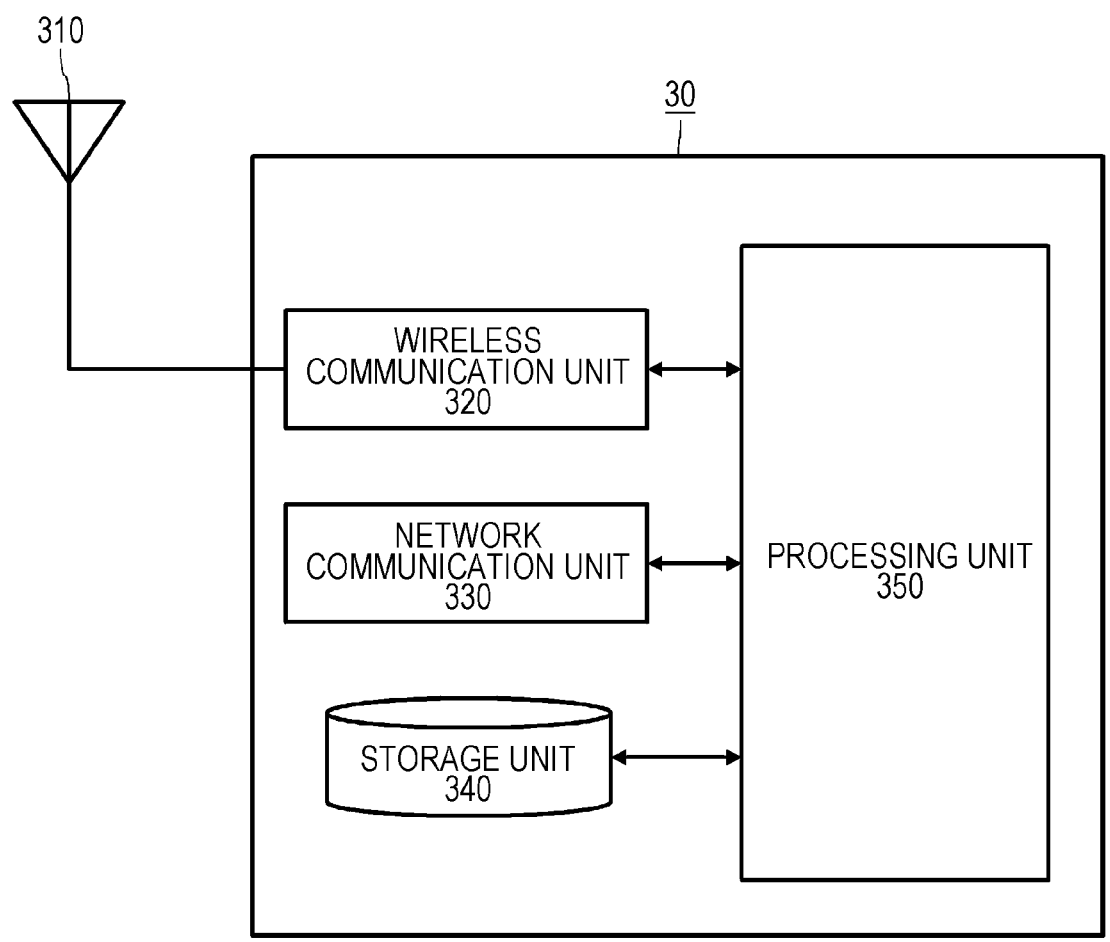
FIG. 20 is a diagram schematically illustrating a functional configuration example of a communication device that operates as a base station (E-UTRAN, eNB).

Furthermore, FIG. 20 schematically illustrates a functional configuration example of a communication device that mainly operates as a base station. The communication device illustrated in FIG. 20 corresponds to, for example, the E-UTRAN in the V2V communication environment illustrated in FIGS. 2 to 6, or the eNB 30 in the wireless communication system illustrated in FIG. 7.

As illustrated in FIG. 20, the eNB 30 includes an antenna unit 310, a wireless communication unit 320, a network communication unit 330, a storage unit 340, and a processing unit 350.

The antenna unit 310 radiates a signal output from the wireless communication unit 320 to space as a radio wave. Furthermore, the antenna unit 310 converts a radio wave in the space into a signal and outputs the signal to the wireless communication unit 320.

The wireless communication unit 320 transmits and receives signals. For example, the wireless communication unit 320 receives an uplink signal from the UE 10, UE 20, or RSU 50, and transmits a downlink signal to the UE 10, UE 20, or RSU 50.

The network communication unit 330 transmits and receives information via a network (not illustrated). For example, the network communication unit 330 transmits information to other nodes and receives information from other nodes. The other nodes mentioned here include other base stations and core network nodes.

The storage unit 340 temporarily or non-volatilely stores a program and various data for operation of the eNB 30.

The processing unit 350 provides various functions of the eNB 30. For example, the processing unit 350 controls communication performed by subordinate user terminals (the UE 10, the UE 20) and the RSU 50.

Furthermore, the processing unit 350 allocates a resource pool for data transmission directly performed between user terminals, in other words, for a sidelink. Moreover, in the present embodiment, the processing unit 350 may also allocate a resource for feedback for returning a feedback signal such as ACK or NACK for data transmission. However, feedback is also a part of sidelink communication, and the resource for feedback is basically allocated within the resource pool for the sidelink.

B. Feedback Method in Sidelink Communication

In the wireless communication system according to the present embodiment, the sidelink in which vehicles directly communicate with each other performs feedback type sidelink communication instead of broadcast communication conventionally used, from the viewpoint of improving frequency utilization efficiency and reliability. In the conventional D2D communication, in sidelink communication, a broadcast signal is transmitted a plurality of times at the physical layer level, and the reception side receives all signals for the time being, and determines whether or not the received signal is addressed to the reception side itself in the upper layer. Thus, there is no concept of retransmission in the first place. On the other hand, in the wireless communication system according to the present embodiment, a scene is assumed where the reception side transmits a feedback signal (for example, ACK/NACK, propagation environment information, or the like) to some signal transmitted in sidelink communication.

As feedback type sidelink communication, two types of scenarios are assumed, a unicast communication in which a transmission terminal communicates with one reception terminal, and a multicast communication in which a transmission terminal communicates with a plurality of reception terminals. Furthermore, unlike the broadcast communication, the latter multicast communication can limit reception terminals that decode data. Limiting to one reception terminal results in unicast communication. Multicast communication is also called group cast communication.

Figure 9:
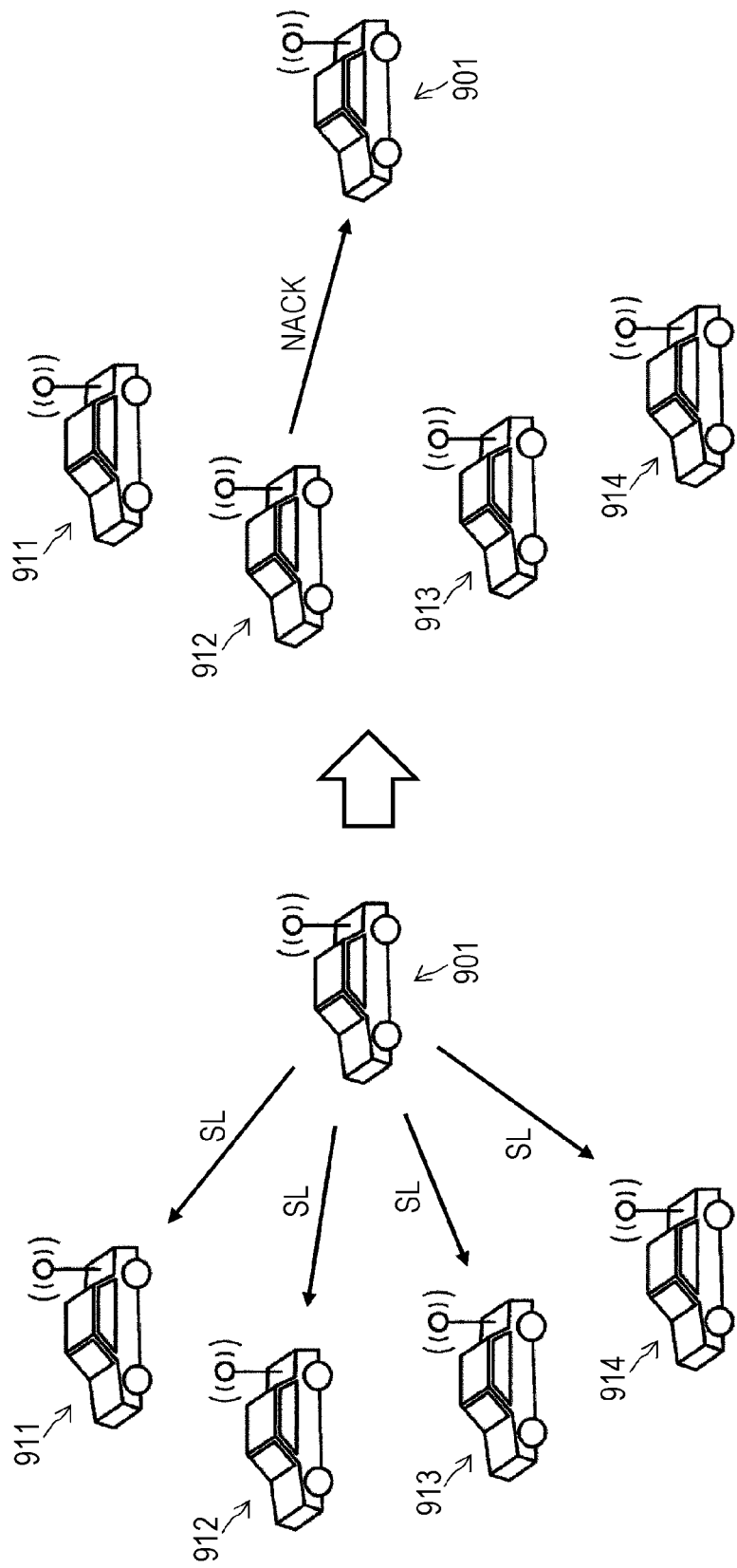
FIG. 9 is a diagram illustrating an example of HARQ operation in feedback type sidelink communication.

FIG. 9 illustrates an example of HARQ operation in feedback type sidelink communication. However, FIG. 9 illustrates a scenario of multicast communication in which a transmission terminal communicates with a plurality of reception terminals. Furthermore, it is assumed that the transmission terminal and the reception terminals each are configured by the communication device illustrated in FIG. 8.

As illustrated on the left side of FIG. 9, a transmission terminal 901 performs sidelink communication that limits decoding of data, to a plurality of reception terminals 911 to 914. Then, as illustrated on the right side of FIG. 9, the reception terminal 912 that has failed to receive or decode data returns NACK to the transmission terminal 901 to perform feedback. Note that, although not illustrated, the reception terminals 911 to 914 that have successfully received the data may return ACK to the transmission terminal 901 to perform feedback.

The transmission terminal 901 that has received the NACK can ensure reliability by performing data retransmission. Furthermore, by adopting feedback or retransmission control in sidelink communication, the number of repeated transmissions can be reduced as compared with a case where broadcast communication is used, and frequency utilization efficiency can be improved.

Furthermore, the reception terminals 911 to 914 can perform feedback of various types of information using the HARQ operation. Then, the transmission terminal 901 can receive information regarding feedback from the reception terminal and perform feedback handling.

FIG. 10 illustrates a processing procedure for the transmission terminal to handle feedback from the reception terminal during sidelink communication in the form of a flowchart. Furthermore, FIG. 11 illustrates a processing procedure for the reception terminal to feed back information to the transmission terminal during sidelink communication in the form of a flowchart. Each processing procedure of the transmission terminal and the reception terminal is performed, led by the processing unit 250 of the communication device that operates as the transmission terminal or the reception terminal.

With reference to FIG. 10, a description will be given of a feedback handling processing procedure in the transmission terminal.

When receiving information regarding feedback from any of the reception terminals (step S1001), the transmission terminal performs feedback handling processing depending on the feedback information (step S1002).

The instruction regarding execution of the feedback in step S1001 may be the transmission terminal itself performing communication, may be an infrastructure such as an RSU or a base station. As will be described later, a resource used for feedback is considered to be allocated by an infrastructure such as an RSU or a base station, allocated by a transmission terminal, or secured by a reception terminal itself that performs feedback.

Furthermore, in step S1002, as the feedback handling processing, control is performed of, for example, a transmission resource, power consumption, Modulation and Coding Scheme (MCS), the number of retransmissions, Transmission Mode, and the like.

Furthermore, the transmission terminal may optionally perform handling processing for receiving feedback information (step S1003). For example, a resource or the like used in a case where feedback information is received from the reception terminal may be secured in advance.

Thereafter, the transmission terminal performs signal transmission to the reception terminal of the communication destination by using parameters determined in step S1002 and step S1003 (step S1004).

Next, with reference to FIG. 11, a description will be given of a processing procedure for performing feedback in the reception terminal.

The reception terminal first performs setting for performing feedback (step S1101). This setting may be set from a transmission terminal of a transmission source, or from an infrastructure such as an RSU or a base station. As will be described later, a resource used for feedback is considered to be allocated by an infrastructure such as an RSU or a base station, allocated by a transmission terminal, or secured by a reception terminal itself that performs feedback.

After the setting is performed for performing feedback, the reception terminal performs measurement for performing feedback (step S1102). For example, the reception terminal performs signal decoding, channel information measurement, calculation of Reference Signal Received Power (RSRP) and Reference Signal Received Quality (RSRQ) for path loss measurement, and the like.

Finally, the reception terminal transmits a feedback result measured in step S1102 to the transmission terminal or an infrastructure such as an RSU or a base station, to perform feedback (step S1103).

In conventional V2X communication, broadcast communication is adopted for the sidelink, and communication using feedback is not introduced. Thus, when feedback communication is performed such as HARQ illustrated in FIGS. 9 to 11 on the sidelink, there is a problem of how to feed back a feedback signal such as ACK and NACK from the reception terminal to the transmission terminal.

Sidelink communication is normally performed by using a resource pool allocated in advance from a base station. Thus, the UE 20 mounted on a mobile body such as a vehicle can perform sidelink communication by using a resource pool that can be freely used by any UE (see, for example, Patent Document 2). In such an environment, two points are main problems of how to define a resource for feedback such as ACK and NACK between the transmission terminal and reception terminal that perform feedback type sidelink communication, and how to share information such as at what timing feedback is performed.

B-1. Securing Resource for Feedback

Here, a method will be described of securing a resource for feedback, which is a first problem for realizing feedback type sidelink communication.

In the 3GPP standard TS 36.213, mode 1 and mode 3 are described as resource allocation methods for the sidelink by the base station (in mode 3, the resource is allocated semi-statically, but resource allocation in mode 1 is not semi-static), and furthermore, mode 2 and mode 4 are standardized as resource allocation methods for the sidelink by the terminal (mode 4 involves sensing, but mode 2 does not involve sensing). Thus, in feedback type sidelink communication, cases are respectively considered where the base station allocates a resource for feedback, and where the terminal allocates a resource for feedback. However, the latter case where the terminal allocates a resource for feedback is further divided into a case where the transmission terminal performs resource allocation and a case where the reception terminal performs resource allocation. Moreover, a case is also assumed where a resource for feedback is allocated by pre-configuration.

B-1-1. Case Where Base Station Allocates Resource for Feedback

In this case, a resource for feedback in a sidelink is allocated by a base station.

In a case where a transmission terminal allocates a data resource, it is necessary for the transmission terminal that the base station allocates a resource for ACK and NACK, additionally.

Figure 12:
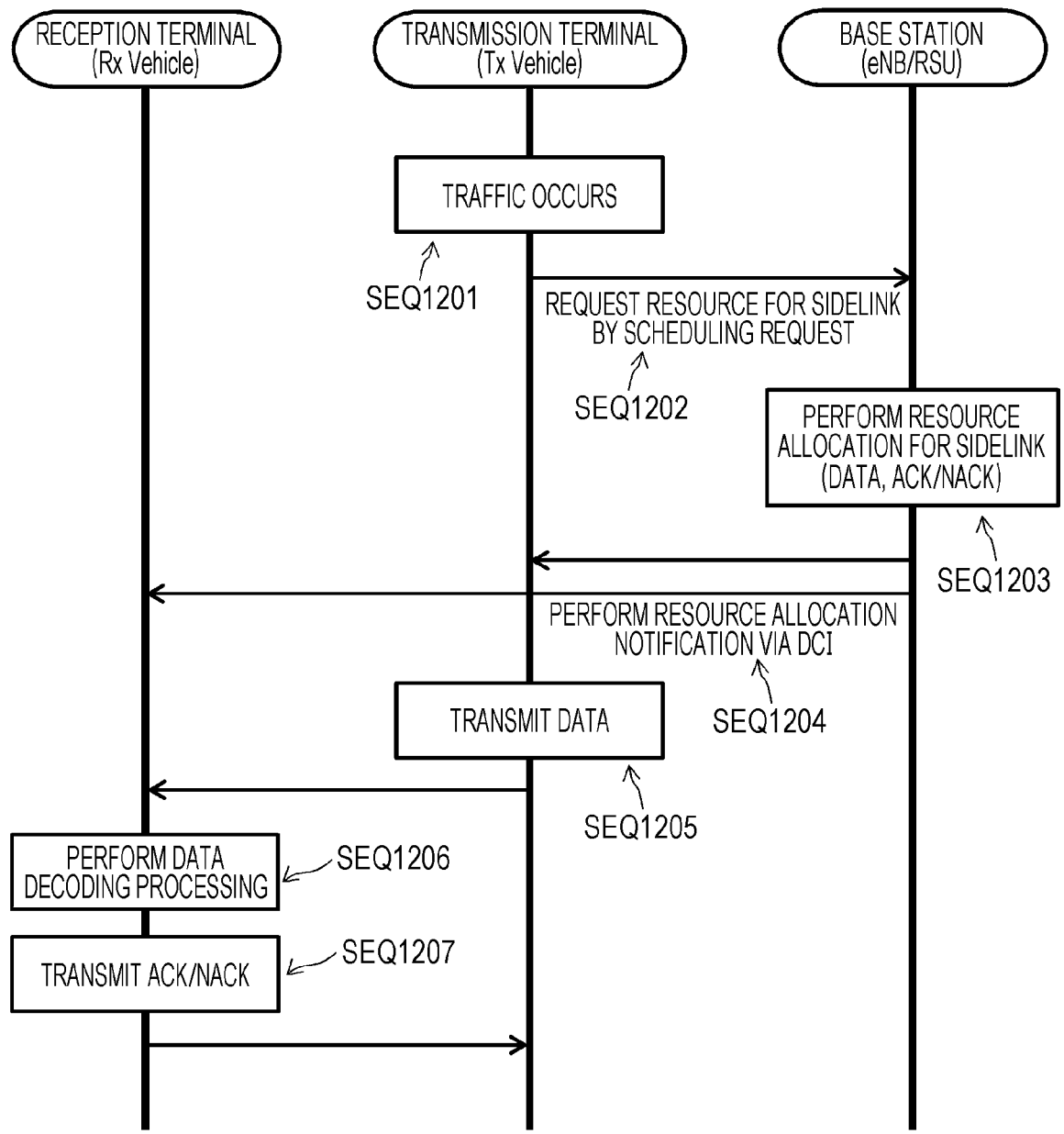
FIG. 12 is a diagram illustrating a communication sequence example in which the base station allocates a resource for feedback in a sidelink.

FIG. 12 illustrates a communication sequence example in which the base station allocates a resource for feedback in the sidelink. Note that, the transmission terminal and the reception terminal in the figure are communication devices (see FIG. 8) respectively mounted on different vehicles, and the base station corresponds to an eNB or RSU.

When traffic occurs (SEQ1201), the transmission terminal requests a resource for the sidelink by a scheduling request to the connection destination base station (SEQ1202). Here, the transmission terminal requests a resource for feedback (in other words, ACK/NACK) in addition to the resource for data transmission.

In response to the resource request for the sidelink from the transmission terminal, the base station performs resource allocation for data transmission and resource allocation for ACK/NACK (SEQ1203). Then, the base station notifies each of the transmission terminal and the reception terminal of the allocated resource via Downlink Control Information (DCI) (SEQ1204).

Thereafter, the transmission terminal performs data transmission to the reception terminal by using the resource allocated for data transmission by the sidelink (SEQ1205). On the other hand, the reception terminal receives the transmission data from the transmission terminal to perform decoding processing (SEQ1206). Then, the reception terminal returns ACK or NACK regarding a reception result of the data or a decoding result of received data to the transmission terminal by using the resource allocated for feedback (SEQ1207).

For example, the transmission terminal requests that the base station allocates the resource for feedback before data transmission. In this case, the transmission terminal notifies the connection destination base station of a communication target device and transmission timing in the sidelink to the communication target device before data transmission. For example, in the example illustrated in FIG. 9, the reception terminals 911 to 914 are communication target devices for the transmission terminal 901.

On the other hand, the base station allocates the resource for feedback in response to the request from the transmission terminal. Then, the base station notifies the communication target device of SL Grant for feedback (resource allocation result in the sidelink) by using a Physical Downlink Control CHannel (PDCCH) of a downlink. Furthermore, the base station also notifies the requesting transmission terminal of the resource allocation result at the same time. It can also be said that the method in which the base station performs resource allocation before data transmission is a dynamic resource allocation method.

Furthermore, as another method in which the base station allocates a resource for feedback, a method can also be considered in which resources for feedback are periodically allocated for all terminals in advance. According to this method, the reception terminal can return ACK or NACK to the transmission terminal by using some of the resources allocated in advance.

The base station provides a resource pool for feedback in a part of the resource pool allocated for the sidelink, and allocates in advance a resource for feedback for each subordinate terminal within the resource pool for feedback. Since the resource for feedback does not change every time data is transmitted, it can be said that this method of allocating a resource is a semi-static resource allocation method.

Figure 13:
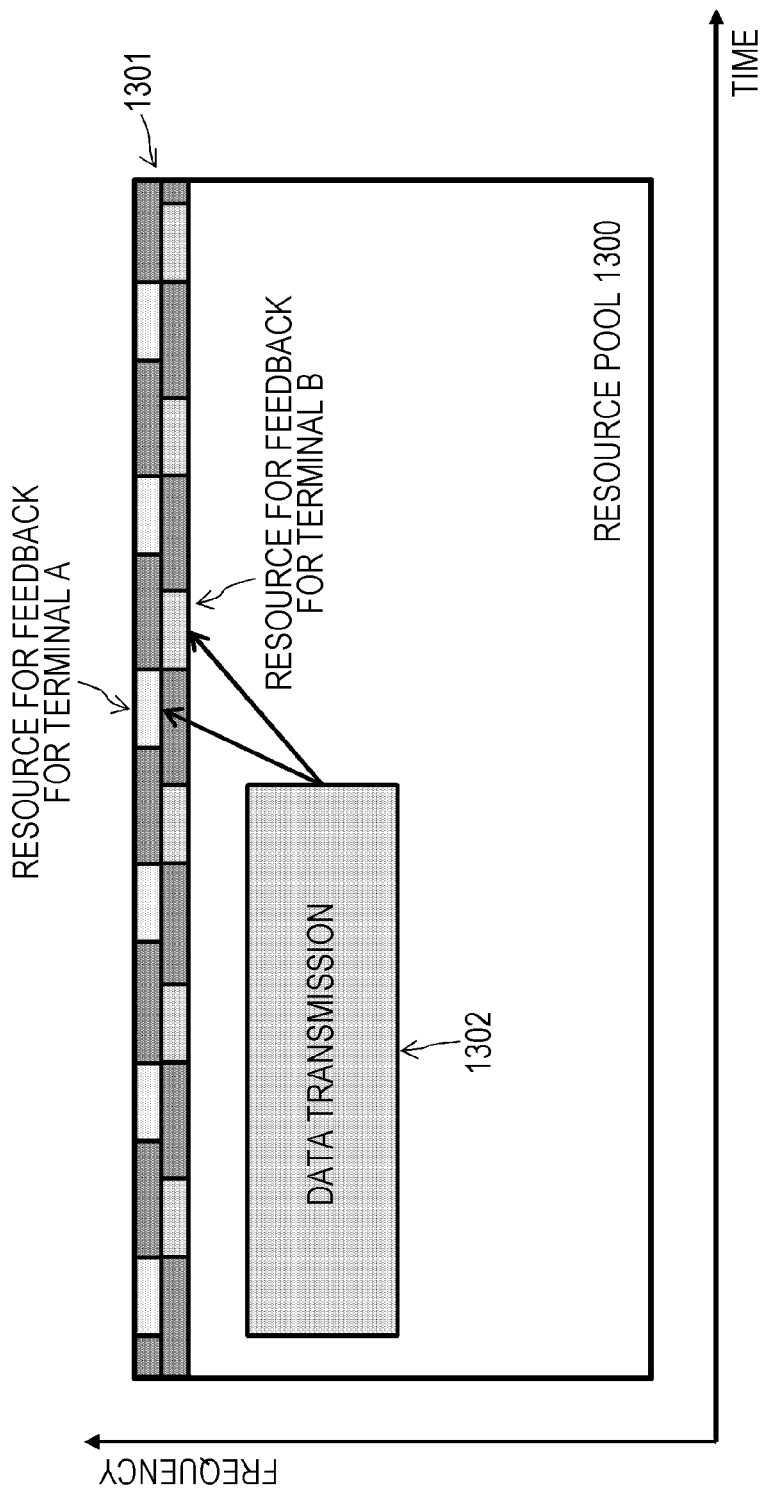
FIG. 13 is a diagram illustrating a state in which a resource pool for feedback is provided in a resource pool for a sidelink.

FIG. 13 illustrates a state in which a resource pool 1301 for feedback is provided in a resource pool 1300 for a sidelink. However, the horizontal axis is the time axis, and the vertical axis is the frequency axis. As illustrated, a resource for feedback for each of a communication target terminal A and a communication target terminal B is allocated in advance in the resource pool 1301 for feedback.

By allocating resources for feedback orthogonal to each other for the terminal A and terminal B in advance, it becomes possible to prevent collision of ACK/NACK packets transmitted from respective terminals. Then, when data transmission 1302 is performed by using the resource pool 1300, each communication target device can return ACK or NACK by using a resource pool for feedback allocated semi-statically for each terminal.

The setting of the resource pool 1300 for the sidelink and the semi-static allocation of the resource 1301 for feedback in the resource pool 1300 are configured by using system information (System Information Block (SIB)) or Radio Resource Control (RRC) signaling from the base station (eNB).

Semi-Persistent Scheduling (SPS) standardized in LTE is a semi-static resource allocation for data. In this case, when SPS configuration is performed and data communication is actually performed, instructions for activation are required sequentially. On the other hand, in a case where the base station allocates a resource for feedback to each terminal semi-statically as described above, the instruction for activation is not necessary, and each terminal can use a resource for feedback allocated semi-statically at any time, and return ACK or NACK.

Referring to FIG. 13 again, each of the communication target terminal A and terminal B receives data 1302, and then selects an earliest available resource in the resource 1301 for feedback and returns ACK or NACK. However, the reception terminal may select the resource for feedback by other methods. A relationship between data transmission completion and resource selection used for ACK/NACK reply will be described in detail later.

By allocating resources for feedback orthogonal to each other for respective terminals in advance, it becomes possible to prevent collision of ACK/NACK packets. Furthermore, a plurality of reception terminals may be multiplexed on the same resource for feedback by using code multiplexing, preamble transmission, or the like. In preamble transmission mentioned here, a Constant Amplitude and Zero Auto-correlation Code (CAZAC) sequence may be used such as a Zadoff-Chu (ZC) sequence. By allocating different sequences for respective reception terminals in advance, even in a case where ACK/NACK are multiplexed and transmitted by using the same resource, user separation is possible on the transmission terminal side. Sequence allocation may be set in advance for each terminal from the base station, or pre-configuration may be performed. Furthermore, sequence allocation may be performed when terminal grouping is performed from the transmission terminal.

B-1-2. Case Where Transmission Terminal Allocates Resource for Feedback

In a case where the transmission terminal allocates a resource for feedback, it is necessary to guarantee that the allocated resource is not used by other terminals. For this reason, when the transmission terminal performs sensing for its own data transmission, it is necessary to perform sensing of a resource for feedback for the reception terminal together, and reserve the resource. Furthermore, the transmission terminal needs to notify the reception terminal of the reserved resource for feedback. The transmission terminal may notify the reception terminal of a position of the resource for feedback by using, for example, Sidelink Control Information (SCI). The SCI is a message transmitted by using a Physical Sidelink Control CHannel (PSCCH).

Figure 14:
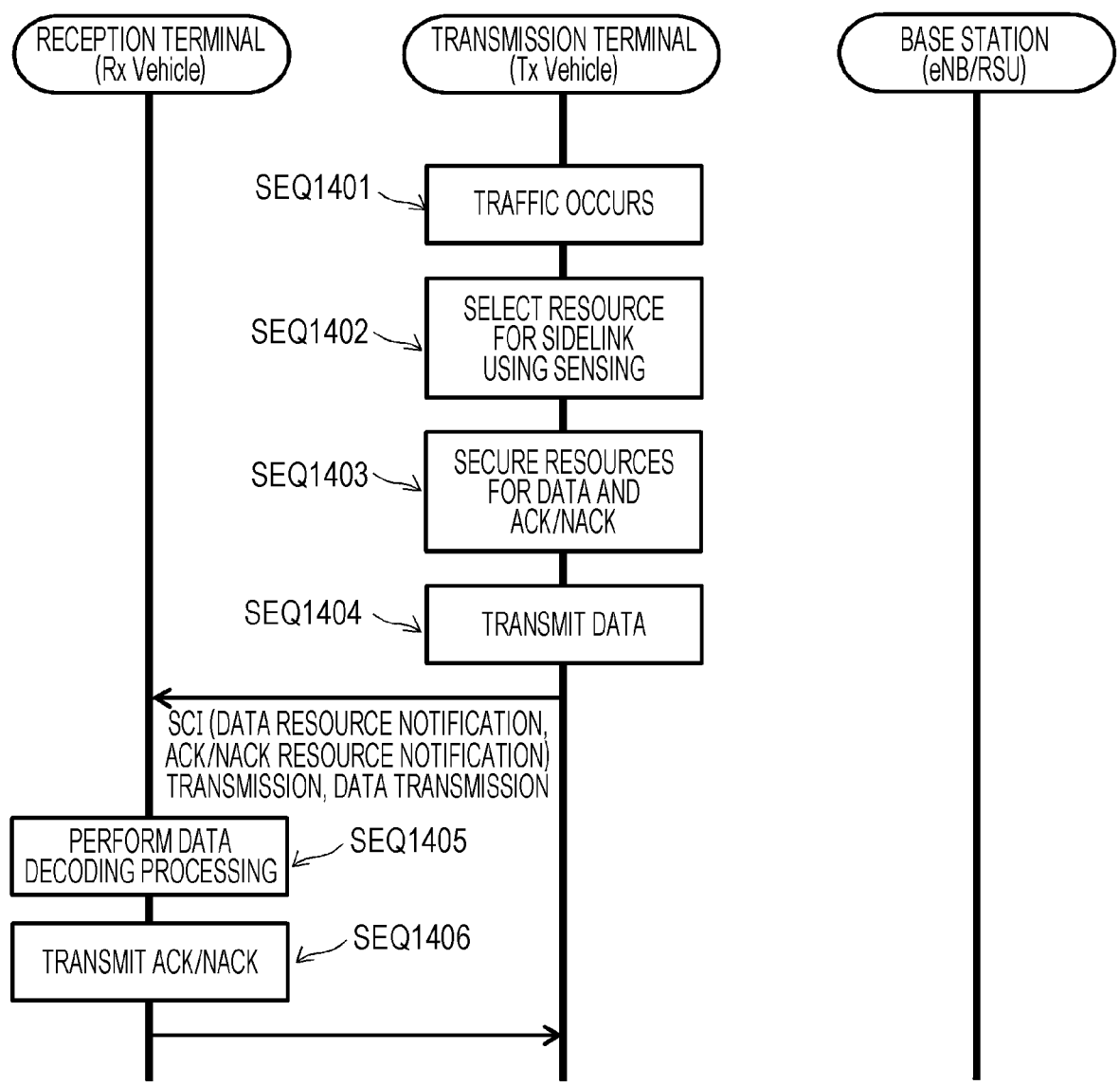
FIG. 14 is a diagram illustrating a communication sequence example in which a transmission terminal allocates a resource for feedback in a sidelink.

FIG. 14 illustrates a communication sequence example in which a transmission terminal allocates a resource for feedback in a sidelink. Note that, the transmission terminal and the reception terminal in the figure are communication devices (see FIG. 8) respectively mounted on different vehicles.

When traffic occurs (SEQ1401), the transmission terminal selects a resource for performing data transmission by the sidelink by using sensing, from the resource pool (described above) (SEQ1402). At this time, the transmission terminal also selects a resource for the reception terminal in the resource pool for feedback provided in the resource pool for the sidelink. In this way, the transmission terminal secures each of the resource for its own data transmission, and the resource for feedback of the reception terminal (SEQ1403).

Thereafter, the transmission terminal notifies the reception terminal of positions of the resource for data transmission and the resource for feedback by using the SCI, and subsequently performs data transmission to the reception terminal by using the resource indicated by the SCI (SEQ1404).

On the other hand, the reception terminal receives the transmission data from the transmission terminal at the position of the resource for data transmission indicated by the SCI, to perform decoding processing (SEQ1405). Then, the reception terminal returns ACK or NACK regarding a reception result of the data or a decoding result of received data to the transmission terminal by using the resource indicated by the SCI from the transmission terminal (SEQ1406).

Furthermore, the transmission terminal may make a resource reservation by using a reservation indicator. A relationship between data transmission completion and resource selection used for ACK/NACK reply will be described in detail later.

A method will be described in detail in which the transmission terminal notifies the reception terminal of the positions of the resource for data transmission and the resource for feedback by using the SCI, in SEQ1404. The transmission terminal includes information indicating the time-frequency domain of the data resource, and the time frequency domain of the resource for feedback, in the SCI. Moreover, in a case where resource reservation is performed by using the reservation indicator, the transmission terminal includes a resource reservation indicator for notification of the resource reservation of the resource for feedback, in the SCI.

On the reception terminal side, in a case where the reservation indicator is included in the SCI, it is recognized that the resource for feedback is reserved for the future. Furthermore, a positional relationship between the resource for feedback and the reserved resource for feedback indicated by the SCI may be indicated as a time offset value in the SCI. At this time, an offset value in the frequency direction may also be included. Furthermore, the reception terminal may estimate the time offset value on the basis of a data transmission period. For example, in a case where the data arrives from the transmission terminal at a period of 100 milliseconds, it can be estimated that the reserved resource for feedback is also reserved by the resource 100 milliseconds ahead.

Figure 15:
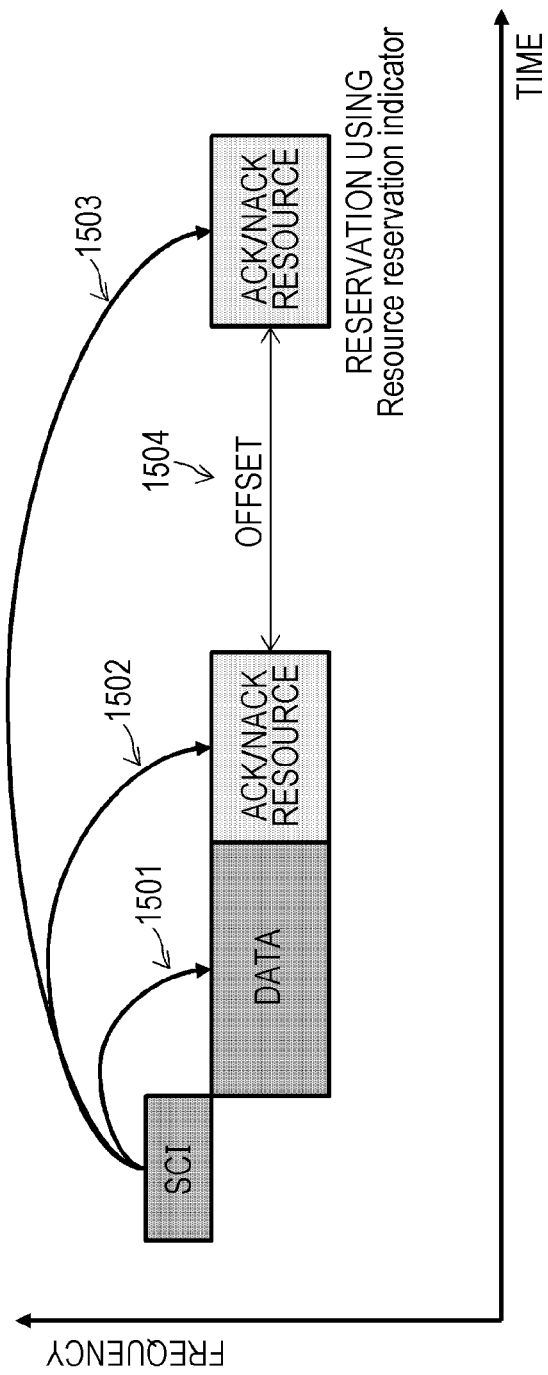
FIG. 15 is a diagram illustrating an allocation example of a resource for feedback.

FIG. 15 illustrates an allocation example of a resource for feedback. However, in the figure, the horizontal axis is the time axis, and the vertical axis is the frequency axis. The transmission terminal transmits the SCI in the sidelink, and then transmits data to the reception terminal. The SCI includes information indicating the time-frequency domain of the data resource indicated by a reference number 1501, and information indicating the time-frequency domain of the resource for feedback indicated by a reference number 1502. Moreover, the SCI includes a resource reservation indicator. The indicator indicates a resource for feedback reserved for the future as indicated by a reference number 1503. Furthermore, the time offset value between the resource for feedback indicated by the SCI and the resource for feedback reserved, indicated by a reference number 1504, may be indicated in the SCI, or may be estimated by the reception terminal on the basis of a data transmission period from the transmission terminal.

Furthermore, a supplementary description will be given of a method of sensing a resource by the transmission terminal, in SEQ1402. The transmission terminal may perform sensing of a resource for feedback by using a method different from a method of sensing a resource for data communication. In the sensing for data communication, a resource is secured while comparison is performed between a priority of transmission data and a priority of a packet transmitted around. On the other hand, in the sensing of the resource for feedback, the resource may be secured by newly defining a priority of ACK or NACK. Since conditions for securing resources differ between data and ACK/NACK, resource sensing is performed with different sensing settings.

B-1-3. Case Where Reception Terminal Allocates Resource for Feedback

The reception terminal receives a data signal from the transmission terminal, and then performs sensing of a resource for feedback for returning ACK or NACK. Then, when the reception terminal finds a resource by sensing, the reception terminal returns ACK or NACK to the transmission terminal by using the resource.

However, the reception terminal has to return ACK/NACK within a range not exceeding the maximum delay time of a packet. The reception terminal is notified of the maximum delay time for each packet through, for example, the SCI transmitted from the transmission terminal before data transmission. In this case, the reception terminal has to secure and transmit a resource for ACK/NACK within the maximum delay time indicated by the SCI.

Furthermore, the reception terminal may notify the transmission terminal of a position of the resource for feedback allocated by the reception terminal itself by using, for example, the SCI. However, in a case where there is no data transmission of the reception terminal itself, a method of transmitting the SCI wastefully is not preferable. For this reason, the reception terminal may transmit the data signal by piggybacking (in other words, by placing the feedback packet on the data packet). In this case, an implicit transmission method can be used such as inserting ACK or NACK at the end of the data.

Figure 16:
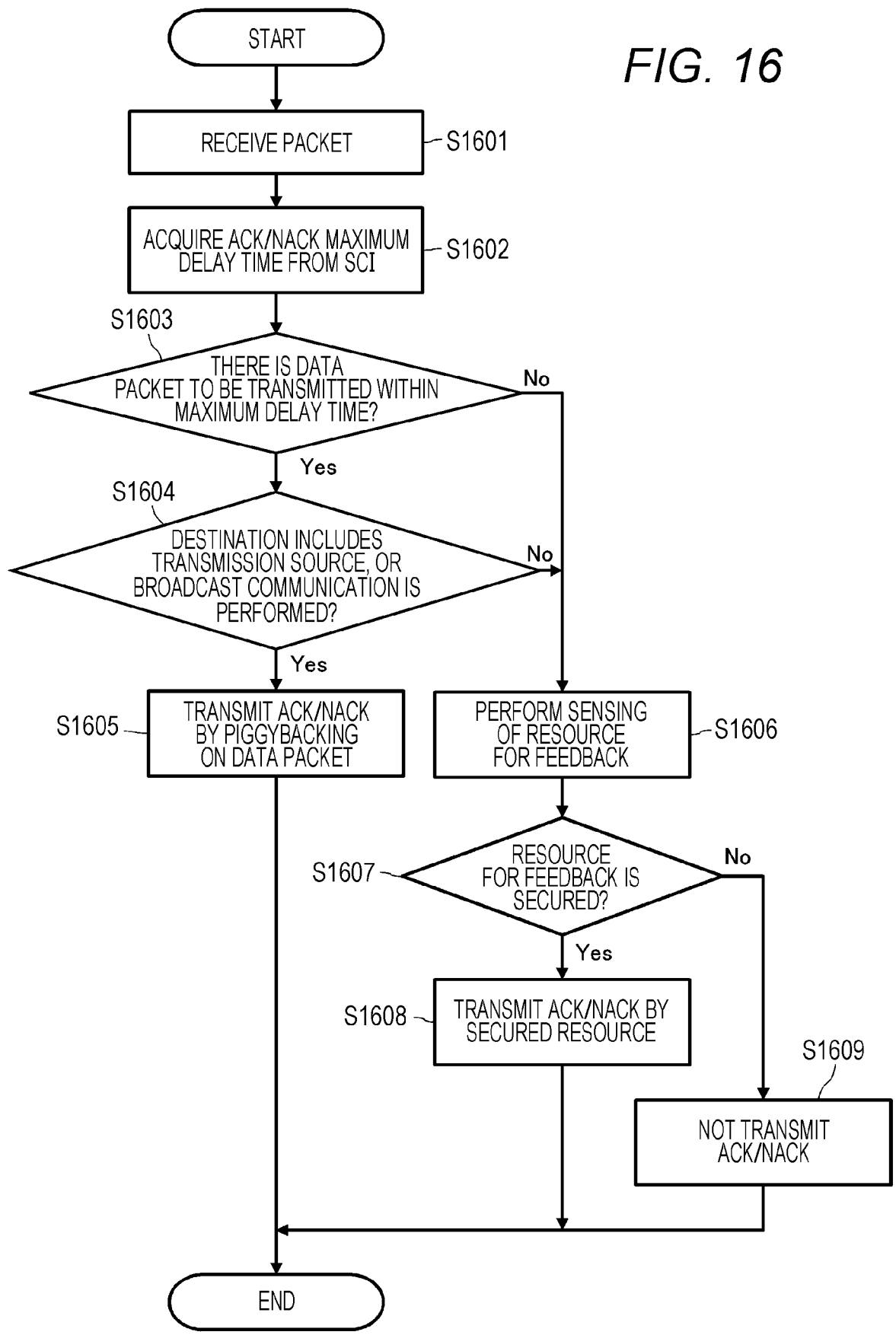
FIG. 16 is a flowchart illustrating a processing procedure for a reception terminal to transmit a feedback signal.

FIG. 16 illustrates a processing procedure for the reception terminal to transmit a feedback signal in the form of a flowchart. The illustrated processing procedure is performed, led by the processing unit 250 of the communication device that operates as a reception terminal. This processing procedure is mainly characterized in that the reception terminal transmits ACK/NACK by piggybacking them on a data packet.

When receiving a data packet from the transmission terminal (step S1601), the reception terminal acquires the maximum delay time for transmitting the feedback signal from the SCI received from the transmission terminal during the data transmission (step S1602).

Next, the reception terminal checks whether or not there is a data packet to be transmitted within the maximum delay time of the feedback signal (step S1603). Here, in a case where there is a data packet to be transmitted within the maximum delay time of the feedback signal (Yes in step S1603), the reception terminal further checks whether or not a destination of the data packet includes a transmission source terminal of the packet received in step S1601, or whether or not the data packet is to be subjected to broadcast communication (step S1604).

Then, when the destination of the data packet of the reception terminal itself includes a transmission source terminal of the packet received in step S1601, or the broadcast communication is performed (Yes in step S1604), the reception terminal transmits ACK or NACK regarding the packet received in step S1601 by piggybacking them on the data packet of the reception terminal itself (step S1605).

On the other hand, in a case where there is no data packet to be transmitted within the maximum delay time of the feedback signal (No in step S1603), or in a case where the destination of the data packet of the reception terminal does not include a transmission source terminal of the packet received in step S1601, and the broadcast communication is not performed (No in step S1604), the reception terminal performs sensing of a resource for feedback (step S1606).

Here, in a case where the resource for feedback can be secured (Yes in step S1607), the reception terminal uses the secured resource to return ACK or NACK to the transmission source terminal of the packet received in step S1601 (step S1608). At that time, the reception terminal may notify the transmission terminal of information of a position of ACK or NACK by placing them on the SCI.

On the other hand, in a case where the resource for feedback cannot be secured (No in step S1607), the reception terminal does not return ACK or NACK (step S1609).

According to the processing procedure illustrated in FIG. 16, the reception terminal can operate not to wastefully transmit the SCI by performing transmission by piggybacking the feedback signal as much as possible.

In a case where the reception terminal allocates a resource for feedback, the transmission terminal may set (or limit) an area of a resource to be used for feedback, for the reception terminal. In such a case, the reception terminal performs sensing of a resource for feedback within the area set by the transmission terminal, and performs transmission. The transmission terminal may limit the area of the resource for feedback, in either or both of the frequency direction and the time direction.

Furthermore, to make it easier to find the resource for feedback, a dedicated resource pool for feedback may be set in the terminal. This setting can be performed through system information (SIB) and RRC signaling from the base station, similarly to normal resource pool allocation. Furthermore, pre-configuration may be performed of the dedicated resource pool for feedback.

In a case where the resource for feedback cannot be secured within the area of the resource specified as described above (or in a case where the resource cannot be secured from the area specified within the maximum delay time), the reception terminal may give up transmission of the feedback signal by the sidelink, and switch to transmission of the feedback signal using an uplink of the base station. In this case, ACK/NACK from the reception terminal is transmitted to the transmission terminal via the base station.

Figure 17:
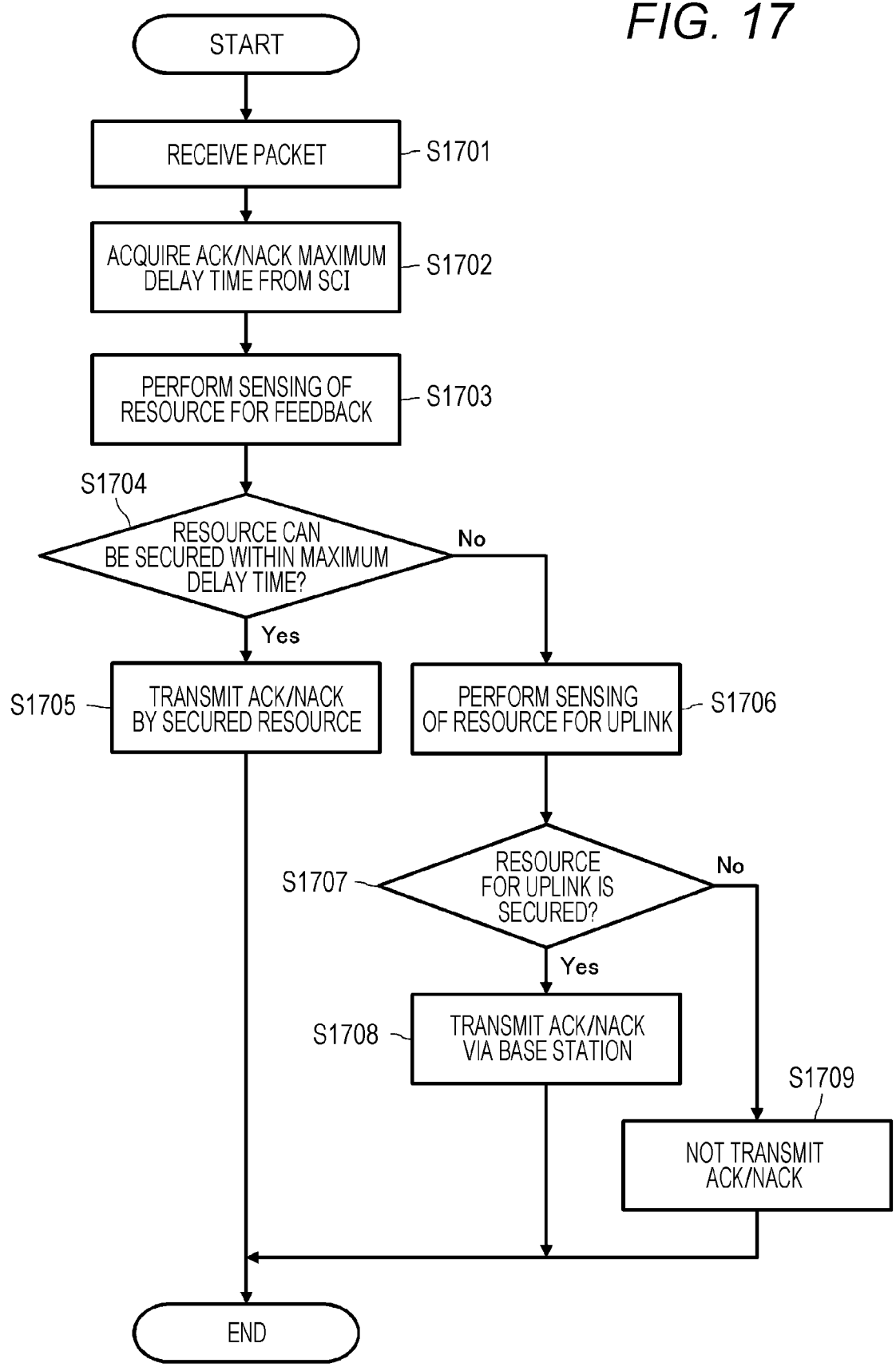
FIG. 17 is a flowchart illustrating a processing procedure for a reception terminal to transmit a feedback signal.

FIG. 17 illustrates another processing procedure for the reception terminal to transmit the feedback signal in the form of a flowchart. The illustrated processing procedure is performed, led by the processing unit 250 of the communication device that operates as a reception terminal. This processing procedure is mainly characterized in that in a case where ACK/NACK cannot be returned on the sidelink within the maximum delay time, the reception terminal switches to feedback transmission using the uplink.

When receiving a data packet from the transmission terminal (step S1701), the reception terminal acquires the maximum delay time for transmitting the feedback signal from the SCI received from the transmission terminal during the data transmission (step S1702).

Next, the reception terminal performs sensing of a resource for feedback (step S1703). Then, in a case where the resource for feedback can be secured within the maximum delay time acquired in step S1702 (Yes in step S1704), the reception terminal uses the secured resource to return ACK or NACK to a transmission source terminal of the packet received in step S1701 (step S1705).

On the other hand, in a case where the resource for feedback cannot be secured within the maximum delay time acquired in step S1702 (No in step S1704), the reception terminal performs resource sensing for uplink communication (in other words, for the connection destination base station) (step S1706).

Here, in a case where a resource for uplink communication can be secured (Yes in step S1707), the reception terminal performs ACK or NACK transmission to the transmission source terminal of the packet received in step S1701, via the base station (step S1708).

Furthermore, in a case where a resource for uplink communication cannot be secured (No in step S1707), the reception terminal does not return ACK or NACK (step S1709).

B-1-4. Case of Allocating Resource for Feedback by Pre-Configuration

A relationship from data transmission to ACK/NACK transmission can be set in advance for all terminals, by pre-configuration. In this case, all terminals that have received the data packet return ACK or NACK in accordance with a pre-configured setting. When performing resource sensing, the terminal can grasp the resource used for ACK/NACK transmission from data signal detection. For this reason, the terminal can perform sensing in consideration of not only data but also the resource for ACK/NACK transmission. Note that, the pre-configuration mentioned here corresponds to, for example, setting at the time of shipment of the terminal (however, it is also assumed that the base station performs rewriting).

B-2. Feedback Timing

Here, a method will be described of performing notification of feedback timing, which is a second problem for realizing feedback type sidelink communication. However, the feedback timing indicates the time from when a terminal receives data until the terminal transmits ACK or NACK. The method of performing notification of the feedback timing is roughly divided into a method of performing notification implicitly and a method of performing notification explicitly. In the following, each notification method will be described.

B-2-1. Method of Performing Notification Implicitly

Figure 18:
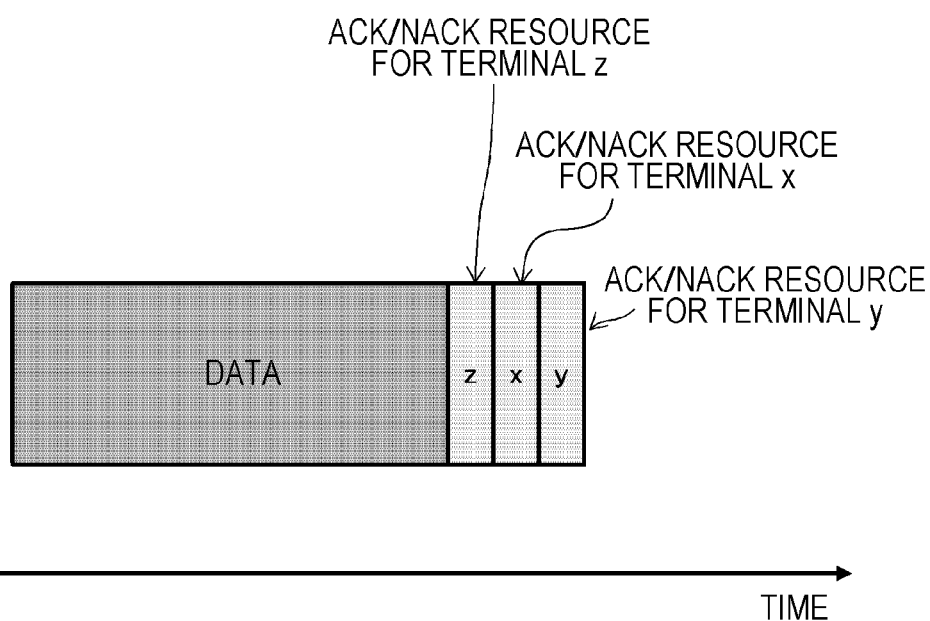
FIG. 18 is a diagram illustrating an example in which resources for feedback are allocated to a plurality of reception terminals with data transmission as a reference.

A case can be considered in which a resource for feedback is allocated with immediately after data transmission as a reference. In the case of multicast communication in which communication is performed with a plurality of reception terminals, it is necessary to determine allocation of a resource for feedback to each reception terminal. FIG. 18 illustrates an example in which a resource for feedback is allocated to each of a plurality of reception terminals x, y, and z with immediately after data transmission as a reference.

Examples of the method of performing notification implicitly include a method of determining the feedback timing of each terminal by using identification information Radio Network Temporary Identifier (RNTI) temporarily given for control by an eNB (base station). A reception terminal may determine which resource the reception terminal uses, by using the RNTI of the other terminal obtained when a multicast group is established. For example, in a case where numbers 1, 5, and 8 are allocated to reception terminals z, x, and y, respectively, the terminal y selects the third resource immediately after data transmission as a resource for ACK/NACK since the terminal y has the third largest number. Similarly, the terminal z selects the first resource immediately after data transmission since the terminal z has the smallest number, and the terminal x selects the second resource since the terminal x has the second largest number.

B-2-2. Method of Performing Notification Explicitly

The following (1) to (4) can be mentioned as a method of performing notification of the feedback timing explicitly. Notification methods will be described respectively.

(1) Offset Information is Inserted in the SCI and the Reception Terminal is Notified.

The transmission terminal notifies the reception terminal of time offset information from data to the ACK/NACK resource by inserting the time offset information in the SCI. On the other hand, a case can also be considered where the reception terminal transmits position information of a resource for which ACK/NACK is to be transmitted, to the transmission terminal, by inserting the position information in the SCI.

(2) Position Information of a Resource for Feedback is Inserted in the SCI and the Reception Terminal is Notified.

The transmission terminal specifies the position of the resource for ACK/NACK, for the reception terminal, by inserting coordinate information in the time direction and the frequency direction into the SCI. Furthermore, the reception terminal may be notified of the position of the resource for the ACK/NACK by using the SCI, as offset information based on the location of the data signal.

(3) Notification is Performed by Using MAC CE.

By inserting the coordinate information in the time direction and the frequency direction into MAC Control Element (MAC CE) transmitted to a UE terminal by the base station (eNB), the position of the resource for ACK/NACK is specified. Furthermore, the reception terminal may be notified of the position of the resource for the ACK/NACK by using the MAC CE, as the offset information based on the location of the data signal.

(4) Notification is Performed of the Resource for Feedback by Using RRC Signaling from the Base Station (eNB).

The base station allocates a semi-static resource for feedback to each terminal. At this time, the base station notifies each terminal of the semi-statically allocated resource for feedback, by using RRC signaling. Alternatively, the base station may notify each terminal of the allocated resource for feedback, by using system information (SIB). Furthermore, the base station may dynamically allocate the resource for feedback to each terminal, and perform notification via DCI.

C. Retransmission Method in Feedback Type Sidelink Communication

Here, a description will be given of a retransmission method by the transmission terminal when NACK is fed back from the reception terminal.

C-1. Retransmission Method During Multicast Communication

The transmission terminal performs data retransmission when NACK is returned from the reception terminal that is the destination of the data packet. As a retransmission method in a case where multicast communication, in which the transmission terminal transmits data packets to a plurality of reception terminals at the same time, is performed and NACK is returned from some reception terminals, methods are conceivable, a method in which the transmission terminal performs multicast communication again, and a method in which unicast communication is performed only for a reception terminal that returns NACK.

C-2. Determination Method of Initial Transmission Signal and Retransmission Signal in Reception Terminal A New Data Indicator (NDI) is identification information indicating whether the signal is initial transmission or retransmission. The reception terminal can determine whether the signal is the initial transmission or the retransmission by using the NDI for multicast.

C-3. Retransmission Trigger

The transmission terminal sets a retransmission trigger condition including one or more parameters, and performs retransmission determination. For example, when a predetermined number of or more parameters satisfy the condition, the transmission terminal starts retransmission. The parameters serving as retransmission trigger conditions and threshold value information for retransmission determination may be set by the base station, for example, or pre-configuration may be performed.

The parameters serving as the retransmission trigger conditions are described below. However, the following parameters are merely examples, and the retransmission trigger conditions are not limited to these. Furthermore, a plurality of parameters may be combined as a retransmission trigger condition.

The number of NACKs received for a predetermined time, a ratio of the reception terminals that returns NACK with respect to the number of destination terminals in multicast communication.

Priority information of the transmission packet.

A channel status of the sidelink such as a channel congestion level and channel occupancy, indicated by a Channel Busy Ratio (CBR), a Channel Occupancy Ration (CR), and the like.

Whether or not a retransmission upper limit number is reached.

The retransmission upper limit number may be set by a base station, or pre-configuration may be performed.

HARQ process status of the terminal

For example, the transmission terminal shares information on the HARQ process status of the reception terminal. The HARQ process status mentioned here includes information such as the number of processes that can be handled and the number of remaining processes. Then, the transmission terminal determines whether or not to retransmit depending on the HARQ process status of the reception terminal. Furthermore, the transmission terminal may notify the base station (eNB) of the determination result. The transmission terminal can take measures such as changing the transmission parameters and transmitting the reception terminal so that transmission can be performed more reliably, for a reception terminal having a small number of remaining processes.

Furthermore, the transmission terminal may determine whether or not to retransmit depending on the HARQ process status of the transmission terminal itself. For example, in a busy situation such as that with a large number of remaining processes, the transmission terminal may suppress retransmission.

Figure 19:
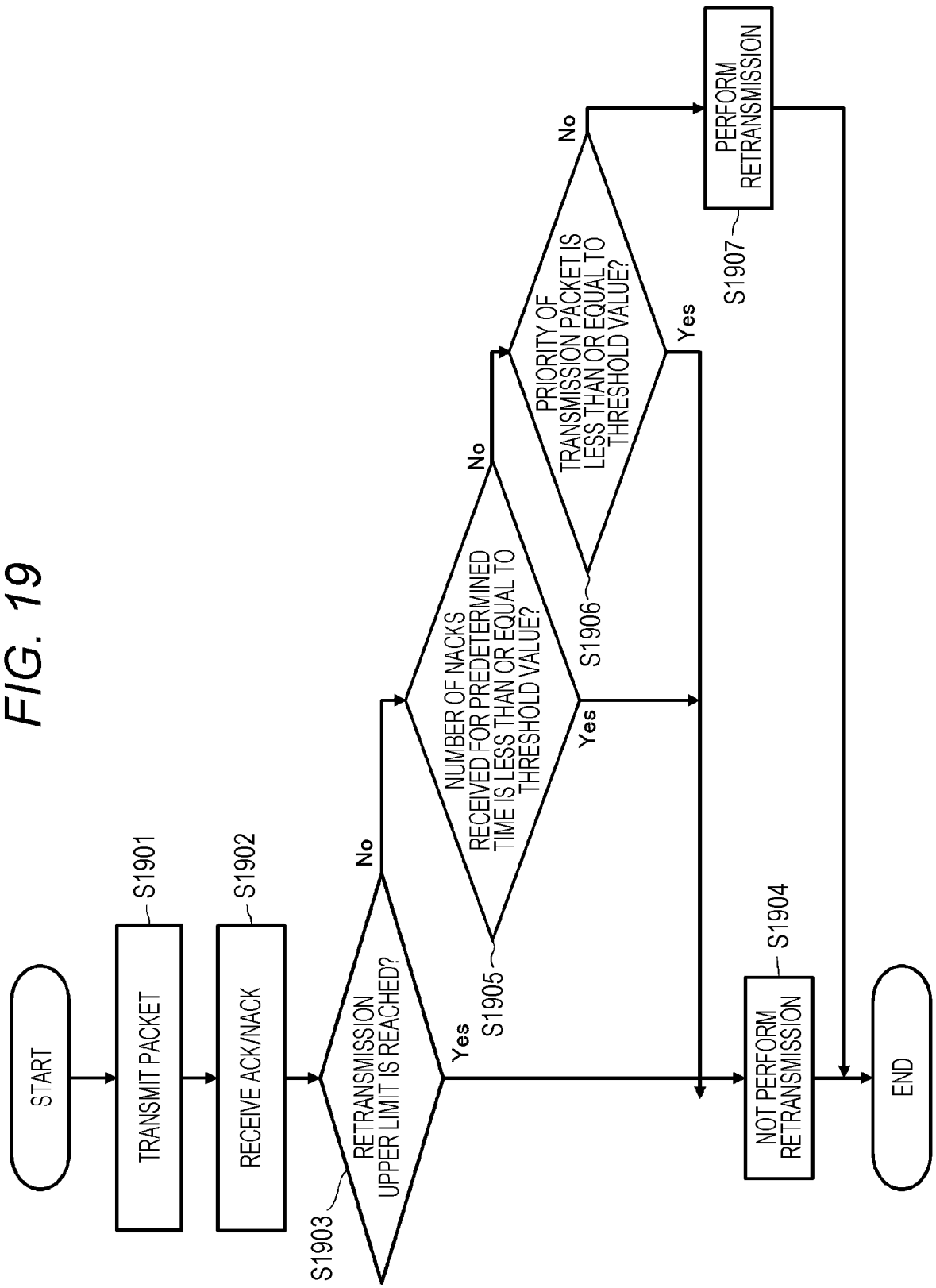
FIG. 19 is a flowchart illustrating a processing procedure for a transmission terminal to perform retransmission control.

FIG. 19 illustrates a processing procedure for the transmission terminal to perform retransmission control in the form of a flowchart. The illustrated processing procedure is performed, led by the processing unit 250 of the communication device that operates as a transmission terminal.

The transmission terminal transmits a data packet to the reception terminal (step S1901), and receives ACN or NACK from the reception terminal (step S1902).

Then, the transmission terminal checks whether or not the retransmission trigger condition is satisfied, and performs retransmission when the retransmission trigger condition is satisfied (step S1907), but does not perform retransmission when the retransmission trigger condition is not satisfied (step S1904), and ends the processing.

In the processing procedure illustrated in FIG. 19, the transmission terminal first checks whether or not the retransmission upper limit is reached, as a retransmission trigger condition (step S1903). Then, when the retransmission upper limit has already been reached (Yes in step S1903), the transmission terminal does not perform retransmission (step S1904), and ends the processing.

On the other hand, when the retransmission upper limit has not yet been reached (No in step S1903), the transmission terminal further checks another retransmission trigger condition.

Specifically, the transmission terminal checks whether or not the number of NACKs received for the predetermined time is less than or equal to a threshold value (step S1905). Then, when the number of NACKs received for the predetermined time is less than or equal to the threshold value (Yes in step S1905), the transmission terminal does not perform retransmission (step S1904), and ends the processing.

Furthermore, the transmission terminal checks whether or not the priority of the packet transmitted in step S1901 is less than or equal to a threshold value (step S1906). Then, when the priority of the transmission packet is less than or equal to the threshold value (Yes in step S1906), the transmission terminal does not perform retransmission (step S1904), and ends the processing.

Furthermore, when the retransmission upper limit has not yet been reached (No in step S1903), and the number of NACKs received for the predetermined time exceeds the threshold value (No in step S1905), and the priority of the transmission packet exceeds the threshold value (No in step S1906), the transmission terminal performs retransmission (step S1907).

C-4. RNTI Allocation Method at the Time of Retransmission

At the time of multicast transmission, transmission is performed by using RNTI such as group RNTI as destination information. The group RNTI is received from the base station when a group link is established. The group link may be allocated through a discovery process or may be allocated from a base station.

The group RNTI is created by using, for example, the following information (1) or (2) so that the group RNTI at the time of multicast transmission does not overlap with the RNTI of another group.

(1) International Mobile Subscriber Identity (IMSI) information of the transmission terminal (2) RNTI generated by using a part of information of the transmission terminal (for example, a group RNTI is generated by using RNTI allocated to the transmission terminal itself)

D. Operation During Feedback Reception

Here, a description will be given of operation performed when the transmission terminal receives a feedback signal from the reception terminal.

The processing procedure for the transmission terminal to handle feedback from the reception terminal during sidelink communication has already been described with reference to FIG. 10. When receiving NACK from the reception terminal, the transmission terminal adjusts the transmission parameters and performs retransmission (however, as described above, retransmission may not be performed when the retransmission trigger condition is not satisfied). The transmission parameters to be adjusted at the time of retransmission are exemplified below.

The number of repeated transmissions (the number of times the same packet is repeatedly transmitted for one transmission)

Transmission power

Redundancy Version (RV) information

MCS

Application of frequency hopping

Priority (priority may be increased for each retransmission)

Change of frequency band

Application of Multiple Input Multiple Output (MIMO), application of beam forming Application of Coordinated Multi-point (CoMP: multi-point coordination for the purpose of expanding coverage at high data rate and improving throughput at the cell edge)

Application of Carrier Aggregation (CA)

Change of resources used (there is also a method to reserve other carriers at the stage of resource reservation)

Multiple Access (MA) signature

Change of resource allocation mode (base station allocation mode <=> terminal allocation mode)

The transmission terminal notifies the reception terminal of the transmission parameters as described above, by using, for example, the SCI.

Note that, some transmission parameters are necessary at the time of initial transmission but are meaningless at the time of retransmission, and conversely, some are unnecessary at the time of initial transmission but are necessary at the time of retransmission. Thus, some fields in the SCI may be replaced between the time of initial transmission and the time of retransmission to reduce the message size. For example, the number of repeated transmissions is required only at the time of initial transmission, but RV information indicating the characteristics of the retransmission data block is required from the time of retransmission. Thus, a field in which the number of repeated transmissions is described in the SCI at the time of initial transmission can be read as a field in which RV information is described at the time of retransmission.

E. Conclusion

In this specification, feedback type sidelink communication has been described that performs communication based on feedback such as HARQ and channel information from the reception side. In the conventional D2D communication, in sidelink communication, a broadcast signal is transmitted a plurality of times at the physical layer level, and the reception side receives all signals for the time being, and determines whether or not the received signal is addressed to the reception side itself in the upper layer. In other words, there is no concept of retransmission in the first place. On the other hand, according to the technology disclosed in this specification, it is possible to adopt feedback or retransmission control in sidelink communication as described above. Thus, since the reception side transmits a feedback signal (for example, ACK/NACK, propagation environment information, or the like) to some signal transmitted in sidelink communication, reliability can be ensured. Furthermore, the number of repeated transmissions can be reduced as compared with a case where broadcast communication is used, and frequency utilization efficiency can be improved.

INDUSTRIAL APPLICABILITY

In the above, the technology disclosed in this specification has been described in detail with reference to specific embodiments. However, it is obvious that those skilled in the art can make modifications and substitutions of the embodiments without departing from the scope of the technology disclosed in this specification.

In this specification, the embodiments related to sidelink communication in V2X communication have been mainly described, but the gist of the technology disclosed in this specification is not limited to this. In other words, the technology disclosed in this specification can be similarly applied to use cases other than V2X communication. The technology disclosed in this specification can be applied to various types of direct communication between terminals such as Device to Device (D2D) communication and Machine Type Communication (MTC). Furthermore, the technology disclosed in this specification can also be applied to a moving cell (mobile base station), relay communication, and the like.

In short, the technology disclosed in this specification has been described in the form of exemplification, and the description content of this specification should not be interpreted restrictively. To determine the gist of the technology disclosed in this specification, the claims should be taken into consideration.

Note that, the technology disclosed in this specification can also have the following configuration.

(1) A communication device including:

a communication unit that transmits and receives wireless signals; and a control unit that controls transmission of data using a predetermined resource pool and reception of feedback from a transmission destination terminal of the data by the communication unit.

(1-1) A communication method including the steps of:

transmitting data using a predetermined resource pool; and receiving feedback transmitted within the predetermined resource pool from a transmission destination terminal of the data.

(2) The communication device according to (1), in which the control unit further performs control to secure a resource for transmission of the data and a resource for the feedback for the transmission destination terminal of the data within the predetermined resource pool.

(3) The communication device according to (2), in which the control unit further performs control to notify the transmission destination terminal of information regarding the resource for the feedback by using SCI.

(4) The communication device according to (3), in which the control unit performs control to perform notification of position information or an offset from the resource for transmission of the data of the resource for the feedback, by using the SCI.

(5) The communication device according to any of (3) or (4), in which the control unit further performs control to reserve the resource for the feedback by using a resource reservation indicator.

(6) The communication device according to (5), in which the control unit further performs control to include, in the SCI, an offset in a time direction or a frequency direction between the resource for the feedback indicated by the SCI and the resource for the feedback reserved.

(7) The communication device according to any of (5) or (6), in which the control unit further performs control to reserve the resource for the feedback, by an offset in a time direction based on a data transmission period.

(8) The communication device according to any of (2) to (6), in which the control unit further performs control to perform sensing of the resource for transmission of the data on the basis of a comparison between a priority of transmission data and a priority of a packet transmitted around, and perform sensing of the resource for the feedback on the basis of a priority defined regarding feedback.

(9) The communication device according to any of (2) to (8), in which
the control unit further performs control to notify the transmission destination terminal of the resource for the feedback secured.

(10) The communication device according to (9), in which
the control unit determines allocation of the resource for the feedback for a plurality of the transmission destination terminals, with immediately after transmission of the data as a reference.

(11) The communication device according to (10), in which
the control unit allocates the resource for the feedback from immediately after the transmission of the data in accordance with an order based on predetermined identification information of the plurality of transmission destination terminals.

(12) The communication device according to any of (1) to (11), in which
the control unit further controls retransmission of the data in response to receiving the feedback.

(13) The communication device according to (12), in which
the control unit determines whether or not to perform data retransmission on the basis of a condition including at least one of a retransmission upper limit number, the number of received NACKs, a priority of the data transmitted, a channel status of a link for transmission and reception of the data and the feedback, or a process status regarding data retransmission in the transmission destination terminal.

(14) A communication device including:
a communication unit that receives an uplink wireless signal from a terminal and transmits a downlink wireless signal to a terminal; and
a control unit that controls allocation of a resource for a sidelink for communication between the terminals, in which
the control unit allocates a resource for feedback within a resource pool allocated for the sidelink.

(15) The communication device according to (14), in which
the control unit periodically allocates the resource for the feedback in the predetermined resource pool.

(16) The communication device according to (15), in which
the control unit further performs control to notify the terminal of information regarding the resource for the feedback by using SIB or RRC signaling.

(17) The communication device according to (15) or (16), in which
the control unit causes an identical resource to be multiplexed into the resource for the feedback for a plurality of terminals by using coded multiplex or preamble transmission.

(17-1) The communication device according to (14), in which
the control unit further performs control to set a limit of a resource that can be allocated to the resource for the feedback in the transmission destination terminal.

(17-2) The communication device according to (17-1), in which
the control unit notifies the terminal of information regarding the set limit of the resource by using RRC signaling or SIB.

(18) A communication device including:
a communication unit that transmits and receives wireless signals; and
a control unit that controls reception of data transmitted by using a predetermined resource pool and transmission of feedback to a transmission source terminal of the data, by the communication unit.

(18-1) A communication method including the steps of:
receiving data transmitted by using a predetermined resource pool; and
transmitting feedback on the data within the predetermined resource pool.

(19) The communication device according to (18), in which
the control unit performs control to transmit feedback by using a resource for feedback secured by the transmission source terminal.

(19-1) The communication device according to any of (18) or (19), in which
the control unit performs control to transmit feedback by using a resource for feedback received from the transmission source terminal by using SCI.

(19-2) The communication device according to (19-1), in which
the control unit recognizes the resource for the feedback reserved, from a resource reservation indicator included in the SCI.

(20) The communication device according to (18), in which
the control unit performs control to transmit feedback by using a resource for feedback periodically allocated in the predetermined resource pool by a base station.

(20-1) The communication device according to (20), in which
the control unit performs control to transmit feedback by using the resource for the feedback received from the base station by using SIB or RRC signaling.

(20-2) The communication device according to any of (20) or (20-1), in which
the control unit performs control to transmit feedback by using the earliest available resource among a plurality of the resources for the feedback.

(20-3) The communication device according to any of (18), (20) to (20-2), in which
the control unit performs control to transmit feedback by using the resource for the feedback received from a base station by using MAC CE or RRC signaling.

(21) The communication device according to (19), in which
the control unit performs control to perform sensing of the resource for the feedback, and to transmit the feedback by using a resource found.

(22) The communication device according to (21), in which
the control unit further performs control to notify the transmission source terminal of the information regarding the resource for the feedback, by the control unit itself, by using SCI.

(23) The communication device according to (21), in which
the control unit further performs control to secure the resource for the feedback within a limit of a resource set by a base station or a transmitting terminal of the data.

(24) The communication device according to any of (18) or (21), in which
the control unit further performs control so that the feedback is piggybacked on the data to be transmitted within a predetermined time after receiving the data, and is transmitted.

(25) The communication device according to any of (1) to (13) or (18) to (24), in which
the communication unit transmits and receives wireless signals by using the predetermined resource pool for the sidelink allocated by a connection destination base station.

(26) The communication device according to any of (1) to (13) or (18) to (24), in which
the control unit further performs control to replace at least a part of parameters of SCI between the time of initial transmission and the time of retransmission.

(27) The communication device according to (26), in which
the control unit further performs control to read a field for notification of the number of repeated transmissions in SCI at the time of initial transmission as a field for notification of RV information at the time of retransmission.

REFERENCE SIGNS LIST

10 UE (user-carrying)
20 UE (vehicle mounted)
22 Mobile body (vehicle)
30 eNB
40 GNSS satellite
50 RSU
210 Antenna unit
220 Wireless communication unit
230 GNSS signal processing unit
240 Storage unit
250 Processing unit
310 Antenna unit
320 Wireless communication unit
330 Network communication unit
340 Storage unit
350 Processing unit

The invention claimed is:
1. A communication device comprising:
circuitry comprising a processor, a memory and a transceiver, the circuitry configured to
transmit and receive wireless signals;
control transmission of data using a predetermined resource pool and reception of feedback from a transmission destination terminal of the data;
secure a resource for transmission of the data and a resource for the feedback for the transmission destination terminal of the data within the predetermined resource pool; and
reserve the resource for the feedback with an offset in a time direction determined based on a data transmission period.
2. The communication device according to claim 1, wherein the circuitry is further configured to:
perform control to notify the transmission destination terminal of information regarding the resource for the feedback by using Sidelink Control Information (SCI).
3. The communication device according to claim 2, wherein the circuitry is further configured to:
perform control to perform notification of position information or an offset from the resource for transmission of the data of the resource for the feedback, by using the SCI.
4. The communication device according to claim 2, wherein the circuitry is further configured to:
perform control to reserve the resource for the feedback by using a resource reservation indicator.
5. The communication device according to claim 4, wherein the circuitry is further configured to:
perform control to include, in the SCI, an offset in a time direction or a frequency direction between the resource for the feedback indicated by the SCI and the resource for the feedback reserved.
6. The communication device according to claim 1, wherein the circuitry is further configured to:
perform control to perform sensing of the resource for transmission of the data on a basis of a comparison between a priority of transmission data and a priority of a packet transmitted around, and perform sensing of the resource for the feedback on a basis of a priority defined regarding feedback.
7. The communication device according to claim 1, wherein the circuitry is further configured to:
perform control to notify the transmission destination terminal of the resource for the feedback secured.
8. The communication device according to claim 7, wherein the circuitry is further configured to:
determine allocation of the resource for the feedback for a plurality of the transmission destination terminals, with immediately after transmission of the data as a reference.
9. The communication device according to claim 8, wherein the circuitry is further configured to:
allocate the resource for the feedback from immediately after the transmission of the data in accordance with an order based on predetermined identification information of the plurality of transmission destination terminals.
10. The communication device according to claim 1, wherein the circuitry is further configured to:
control retransmission of the data in response to receiving the feedback.
11. The communication device according to claim 10, wherein the circuitry is further configured to:
determine whether or not to perform data. retransmission on a basis of a condition including at least one of a retransmission upper limit number, a number of received NACKs, a priority of the data transmitted, a channel status of a link for transmission and reception of the data and the feedback, or a process status regarding data retransmission in the transmission destination terminal.
12. A communication device comprising:
circuitry comprising a processor, a memory and a transceiver, the circuitry configured to
transmit a downlink wireless signal to a first terminal and a second terminal;
control allocation of a resource pool for a sidelink for communication between the first and second terminals; and allocate a resource for feedback between the first and second terminals within the resource pool allocated for the sidelink, wherein the resource for feedback is allocated periodically in advance without a request from the first and second terminals in a semi-static manner.

13. The communication device according to claim 12, wherein the circuitry is further configured to:

perform control to notify the first and second terminals of information regarding the resource for the feedback by using System Information Block (SIB) or Radio Resource Control (RRC) signaling.

14. The communication device according to claim 12, wherein the circuitry is further configured to:

cause an identical resource to be multiplexed into the resource for the feedback for a plurality of terminals by using coded multiplex or preamble transmission.

15. A communication device comprising:

circuitry comprising a processor, a memory and a transceiver, the circuitry configured to transmit and receive wireless signals; and a control unit that controls reception of data transmitted by using a predetermined resource pool and transmission of feedback to a transmission source terminal of the data, by the communication unit, wherein a resource is secured for the feedback to the transmission source terminal of the data within the predetermined resource pool, and the resource for the feedback is reserved with an offset in a time direction determined based on a data transmission period.

16. The communication device according to claim 15, wherein the circuitry is further configured to:

perform control to transmit feedback by using a resource for feedback secured by the transmission source terminal.

17. The communication device according to claim 14, wherein the resource for feedback does not change every time data is transmitted between the first and second terminals.

* * * * *